US009446705B2

(12) United States Patent
Dwyer

(10) Patent No.: US 9,446,705 B2
(45) Date of Patent: Sep. 20, 2016

(54) START FAULT INDICATOR SYSTEM

(75) Inventor: Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 45 days.

(21) Appl. No.: 14/354,742

(22) PCT Filed: Oct. 28, 2011

(86) PCT No.: PCT/US2011/058275
§ 371 (c)(1),
(2), (4) Date: Apr. 28, 2014

(87) PCT Pub. No.: WO2013/062574
PCT Pub. Date: May 2, 2013

(65) Prior Publication Data
US 2014/0266659 A1    Sep. 18, 2014

(51) Int. Cl.
| B60Q 1/00 | (2006.01) |
| A01D 34/68 | (2006.01) |
| A01D 34/82 | (2006.01) |
| F02N 11/10 | (2006.01) |

(52) U.S. Cl.
CPC ......... *B60Q 1/0064* (2013.01); *A01D 34/6818* (2013.01); *A01D 34/828* (2013.01); *F02N 11/108* (2013.01); *B60Y 2200/223* (2013.01); *F02N 11/101* (2013.01); *F02N 2200/02* (2013.01); *F02N 2200/023* (2013.01); *F02N 2200/061* (2013.01); *F02N 2200/08* (2013.01); *F02N 2200/0802* (2013.01); *F02N 2200/0814* (2013.01); *F02N 2200/10* (2013.01); *F02N 2200/102* (2013.01); *F02N 2200/106* (2013.01)

(58) Field of Classification Search
CPC ........... A01D 34/6818; A01D 34/828; B60Q 1/0064; B60Y 2200/223; F02N 11/108; F02N 2200/02; F02N 2200/023; F02N 2200/061; F02N 2200/08; F02N 2200/0802; F02N 2200/10; F02N 2200/102; F02N 2200/106
See application file for complete search history.

(56) References Cited

U.S. PATENT DOCUMENTS

| 4,447,860 A | 5/1984 | Stone et al. |
| 4,483,072 A | 11/1984 | Nagashima et al. |
| 6,164,560 A | 12/2000 | Lehrke et al. |

(Continued)

FOREIGN PATENT DOCUMENTS

| EP | 1059442 A2 | 12/2000 |
| EP | 1333174 A1 | 8/2003 |

(Continued)

OTHER PUBLICATIONS

International Preliminary Report on Patentability of PCT/US2011/058275 issued Apr. 29, 2014.

(Continued)

*Primary Examiner* — Ojiako Nwugo
(74) *Attorney, Agent, or Firm* — Nelson Mullins Riley & Scarborough LLP

(57) ABSTRACT

A start fault indicator system for outdoor power equipment may include an illuminating element and circuitry to perform start condition checks to determine if a start fault has occurred. The illuminating element may be configured to illuminate a first predetermined color in response to detection of a start fault occurring, and illuminate a second predetermined color in response to determining that no start fault is outstanding, where the first and second predetermined colors are different colors.

19 Claims, 16 Drawing Sheets

(56) References Cited

U.S. PATENT DOCUMENTS

| | | | |
|---|---|---|---|
| 6,320,497 | B1 | 11/2001 | Fukumoto et al. |
| 6,609,357 | B1* | 8/2003 | Davis .................. A01D 34/006 |
| | | | 56/10.2 A |
| 6,693,523 | B1 | 2/2004 | Abel et al. |
| 7,321,294 | B2 | 1/2008 | Mizumaki |
| 7,449,994 | B1* | 11/2008 | Koerner ................ F02B 61/045 |
| | | | 340/438 |
| 2004/0201286 | A1 | 10/2004 | Harvey et al. |
| 2006/0155582 | A1 | 7/2006 | Brown |
| 2008/0220718 | A1 | 9/2008 | Sakamoto et al. |
| 2009/0040061 | A1 | 2/2009 | Golunski et al. |
| 2010/0114026 | A1* | 5/2010 | Karratt .............. A61M 5/14248 |
| | | | 604/151 |
| 2010/0125384 | A1* | 5/2010 | Wyatt .................. B60K 7/0007 |
| | | | 701/22 |
| 2010/0188203 | A1* | 7/2010 | Wallace ................ B60Q 11/00 |
| | | | 340/454 |
| 2010/0188304 | A1* | 7/2010 | Clymer ................. H01Q 1/185 |
| | | | 343/753 |
| 2010/0214107 | A1 | 8/2010 | Montebovi |
| 2011/0071420 | A1 | 3/2011 | St. Pierre et al. |
| 2011/0084852 | A1 | 4/2011 | Szczerba |
| 2013/0103989 | A1* | 4/2013 | Jensen ................ G06F 11/0793 |
| | | | 714/47.2 |

FOREIGN PATENT DOCUMENTS

| | | |
|---|---|---|
| GB | 2221880 A | 2/1990 |
| JP | 2000356164 A | 12/2000 |
| JP | 2003304305 A | 10/2003 |
| JP | 2007068515 A | 3/2007 |
| WO | 2008005886 A2 | 1/2008 |
| WO | 2009092157 A1 | 7/2009 |
| WO | 2010051409 A2 | 5/2010 |

OTHER PUBLICATIONS

International Search Report of PCT/US2011/058275 mailed Mar. 7, 2012.
Written Opinion of PCT/US2011/058275 mailed Mar. 7, 2012.

* cited by examiner

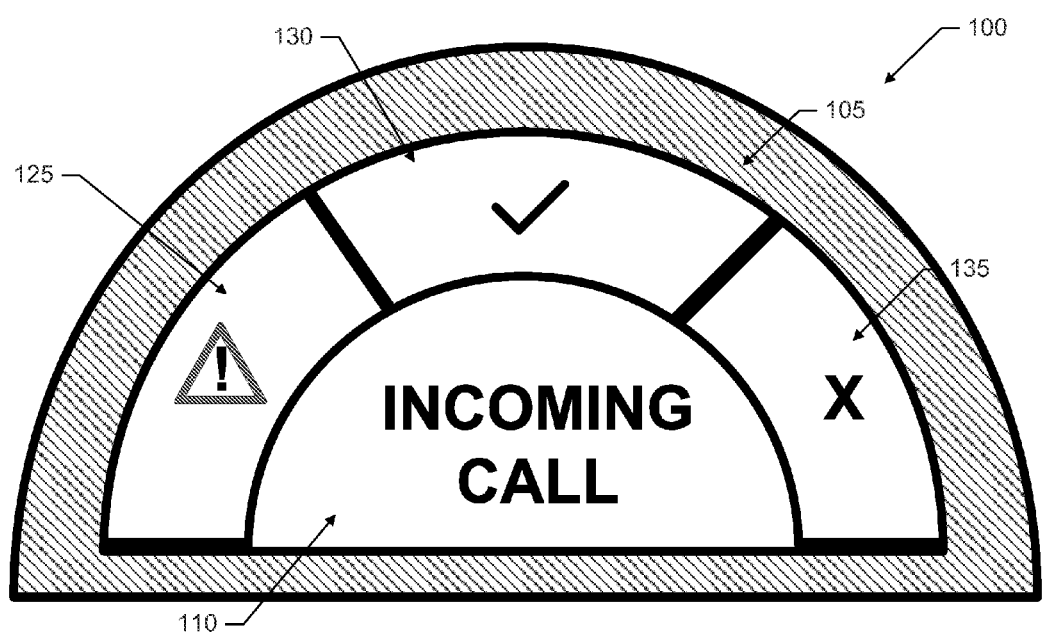

START FAULT INDICATOR SYSTEM

BACKGROUND

Outdoor tasks, such as grooming and maintaining property, are commonly performed using various outdoor power equipment that is configured for the performance of corresponding specific tasks. For example, outdoor power equipment, such as a riding lawn mower, chainsaw, hedge trimmer, string trimmer, and/or the like, may be used for cutting grass, hedges, trees, etc.

From time to time there may be a need to provide some information to an operator of the outdoor power equipment while the operator is operating the equipment. However, communicating with the operator can be difficult considering that the environment is usually noisy and the operator is usually focused on the task at hand. Currently a piece of outdoor power equipment may have one or two small gauges for providing limited information to the operator. However, these gauges are often small, black-and-white, communicate very limited information, and are often difficult to see during operation due to their placement on the equipment, their size, and/or the environment. Furthermore, the operator is usually so intently focused on operating the equipment and completing the outdoor task that the operator will rarely notice the conventional gauges and meters in time to identify an important issue.

BRIEF SUMMARY OF SOME EXAMPLES

Accordingly, in order to improve operator satisfaction in connection with using outdoor power equipment, some example embodiments may provide an indicator system for outdoor power equipment, such as for a riding lawn mower. The indicator system may be useful for providing the operator of the outdoor power equipment with a light of a specific color (or other method) that will alert or notify the outdoor power equipment operator of a specific condition occurring and communicate to the operator whether the operator should look closer at an associated display screen which is simultaneously displaying more detailed textual of graphical information about the specific condition.

In this regard, some embodiments of the invention provide an indicator system for outdoor power equipment. The indicator system includes an electrical system configured to determine an occurrence of a predefined condition. The indicator system further includes a display screen and an illuminating element corresponding to the display screen. In some embodiments, the illuminating element comprises a light source that completely surrounds the perimeter of the display screen. The electrical system is further configured to, upon detection of an occurrence of a particular predefined condition, illuminate the illuminating element in a particular manner (e.g., in a particular color) based on the particular predefined condition. At the same time, the electrical system is also configured to display visual information about the particular predefined condition on the display screen.

For example, some embodiments of the invention provide a riding lawn mower having: (1) a cutting system comprising at least one blade for cutting grass; (2) a drive system comprising at least one wheel for propelling the riding lawn mower; (3) an engine operably coupled to the cutting system and the drive system for powering the drive system and the cutting system; (4) an operator station upon which an operator can ride during operation of the riding lawn care vehicle; (5) an operator control system located proximate to the operator station and operably coupled to the drive system and the cutting system; (6) a computer system configured to detect an occurrence of a predefined condition related to the operator or operation of the cutting system, drive system, or engine; and (7) an indicator system positioned proximate to the operator station, the indicator system comprising an illuminating element and a display screen, where the illuminating element surrounds at least a portion of the perimeter of the display screen. In such embodiments, the computer system is configured to, upon detection of an occurrence of a particular predefined condition, illuminate the illuminating element in a particular manner based on the particular predefined condition and display information about the particular predefined condition on the display screen.

In some embodiments of the riding lawn mower, the illuminating element is capable of lighting in a plurality of different colors, each color being associated with a different predefined condition or type of condition. For example, the illuminating element may be configured to glow at least three colors, where a first color indicates a warning being displayed on the display screen that requires attention, a second color indicates that there are no warnings, and a third color indicates that information of a neutral type is being displayed on the display screen.

Some embodiments of the riding lawn mower further include a memory device having information stored therein that pairs each of a plurality of predefined conditions with a combination of: a manner of illuminating the illuminating element, and a textual or graphical message to be displayed on the display screen.

In some embodiments of the riding lawn mower, the operator control system includes a steering assembly for steering the riding lawn care vehicle, and the indicator system is integrated into a portion of a steering assembly.

In some embodiments of the riding lawn mower, the predefined condition comprises a fault such and, in response to the fault occurring, the illuminating element illuminates a predetermined color associated with the fault. In some instances the predefined condition comprises at least one of: detecting if there is no operator in the operator station; detecting if fuel in a fuel tank has dropped below a predetermined level indicating low fuel; detecting a service/check engine warning; detecting a low oil/oil pressure fault; detecting a tire pressure fault; detecting a engine heat warning; detecting a transmission heat warning; detecting that RPM of a blade or the engine has passed a threshold; or detecting a steep incline fault.

In some embodiments of the riding lawn mower, the predefined condition comprises detecting an incoming communication. In response to the detecting the incoming communication, the illuminating element may be configured to illuminate a predetermined color associated with incoming communications and the display screen may be configured to display a textual message regarding the incoming communication. In this regard, the riding lawn mower may further include a wireless communication device configured to communicate with a mobile device, and the detecting of an incoming communication may include detecting that the mobile device is receiving at least one of: a cellular telephone call; an incoming email; a short range wireless communication call; a text message; a page; or a calendar reminder. The display screen may then be configured to display information about the sender of the incoming communication, such as a phone number, a name, or an icon, while the illuminating element is lit with a color that indicates an incoming communication.

Embodiments of the invention also provide a method of alerting an operator of a riding lawn care vehicle, the method comprising: (1) monitoring the riding lawn care vehicle to determine if any predefined triggering conditions have occurred; (2) detecting that a particular predefined triggering condition has occurred; (3) in response to detecting the occurrence of the particular predefined triggering condition, illuminating a periphery of a display screen in a first predetermined manner based on the particular predefined triggering condition or based on a type of predefined triggering condition that includes the particular predefined triggering condition; and (4) displaying text or graphics that provide more detail about the particular predefined triggering condition on a display screen while illuminating the periphery of the display screen in the first predetermined manner. The method may further include, in response to the particular predefined triggering condition having been corrected or overridden, illuminating an illuminating element of an indicator system to a second predetermined color, wherein the second predetermined color is different from the first predetermined color. The method of claim may also involve determining if the predefined triggering condition is an alert that can be overridden, and, in response to detecting an override button being activated or depressed, overriding the alert and illuminating an illuminating element of an indicator system to a second predetermined color, wherein the second predetermined color is different from the first predetermined color.

In another example embodiment, a start fault indicator system for outdoor power equipment may include an illuminating element and circuitry to perform start condition checks to determine if a start fault has occurred. The illuminating element may be configured to illuminate a first predetermined color in response to detection of a start fault occurring, and illuminate a second predetermined color in response to determining that no start fault is outstanding, where the first and second predetermined colors are different colors.

In another example embodiment, a riding lawn care vehicle includes an engine, an ignition and a start fault indicator system. The ignition may be configured to receive a key, and the ignition has a first position and a second position such that when the key is moved to the second position, the engine of the riding lawn care vehicle may be cranked. The start fault indicator system includes an illuminating element and circuitry to perform start fault checks to determine if a start fault has occurred. The illuminating element is configured to present a first predetermined color in response to detection of a start fault occurring, and to present a second predetermined color in response to determining that no start faults are outstanding, where the first and second predetermined colors being different colors.

In another example embodiment, a method of alerting an operator of a riding lawn care vehicle includes determining if any predetermined triggering conditions have occurred. If not, an illuminating element of an indicator system is illuminated to a first predetermined color. However, if a predetermined triggering condition has been detected, the illuminating element is illuminated to a second predetermined color, where the second predetermined color is different from the first predetermined color. In further embodiments, such method includes receiving a key into an ignition of the riding lawn care vehicle. The ignition has a first position and a second position, where the second position is configured to crank an engine of the riding lawn care vehicle. After being fully inserted into the ignition, the key is detected as having been moved to the first position. In response to detecting that the key has been moved to the first position, the determining if any predetermined triggering conditions have occurred.

Some example embodiments may improve the ability of operators and/or fleet managers to monitor various triggers, events and/or conditions regarding the operation of a riding lawn care vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 13 is a front view of a separate display screen of the indicator system of a riding lawn care vehicle according to another example embodiment;

FIG. 14 is a front view of the indicator system of a riding lawn care vehicle according to another example embodiment;

FIG. 15 is a front view of a separate display screen of the indicator system of a riding lawn care vehicle according to another example embodiment;

DETAILED DESCRIPTION

Figure 1A:
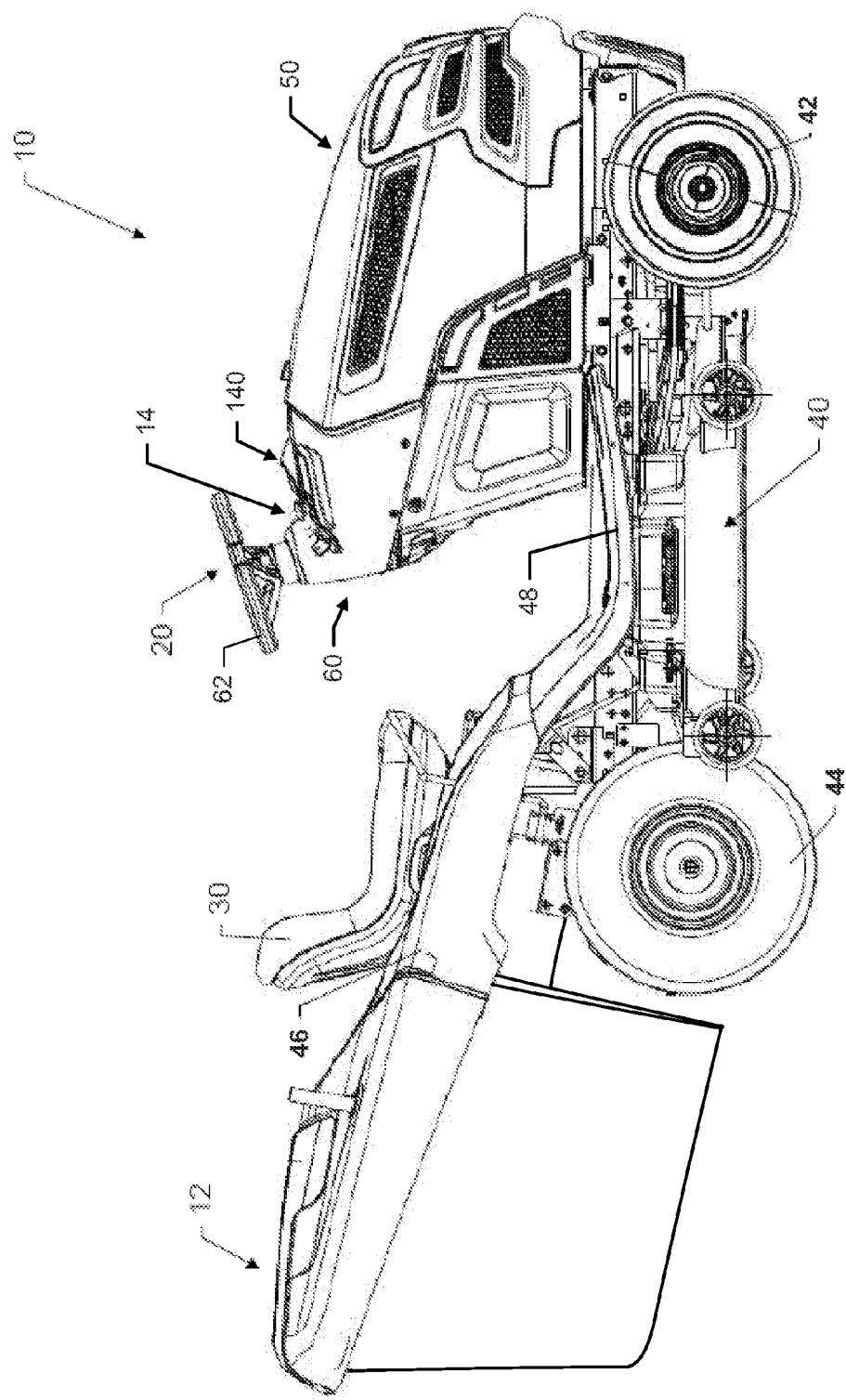
FIG. 1A illustrates a side view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, an outdoor power equipment device, such as a riding lawn mower, includes an indicator system. The indicator system may include an illumination element around the periphery of a display screen, where the illumination element lights-up in different manners depending on different conditions (e.g., events, triggers, conditions, or the like) of the outdoor power equipment device. For example, the illumination element may glow yellow to indicate that the outdoor power equipment device is low on fuel, may glow red to indicate that the outdoor power equipment device has certain operational faults that need to be addressed, and may flash blue to if the operator is receiving a phone call. Illumination of the periphery of the display screen and/or the manner of illumination (e.g., the color, speed of flash, etc.) may direct the operator's attention to the display screen which provides more detail about the particular condition that prompted the illumination of the illumination element.

In one example embodiment, when the operator inserts the key into the ignition, the illuminating element turns a predetermined color (e.g., green) if the power equipment is ready to start, but turns a different predetermined color (e.g., red or yellow) if the power equipment can't or shouldn't be started in its current condition. If the power equipment is ready to start, the display screen may read "OK to start" or "ready", but if the outdoor power equipment device is not ready to start, the display screen may instruct the operator to fix a certain condition.

It should be understood that the present disclosure is applicable to any outdoor power equipment, such as a riding lawn care vehicle, a chainsaw, a string trimmer, or any other power equipment. However, for ease of illustration and description, the figures and the related description of the present disclosure generally illustrate an embodiment where the outdoor power equipment is a riding lawn care vehicle, such as a riding lawn mower. Therefore, the present disclosure should not be limited to only a riding lawn care vehicle, and is also applicable to other outdoor power equipment, including chainsaws, string trimmers, hedge trimmers, and the like.

Figure 1B:
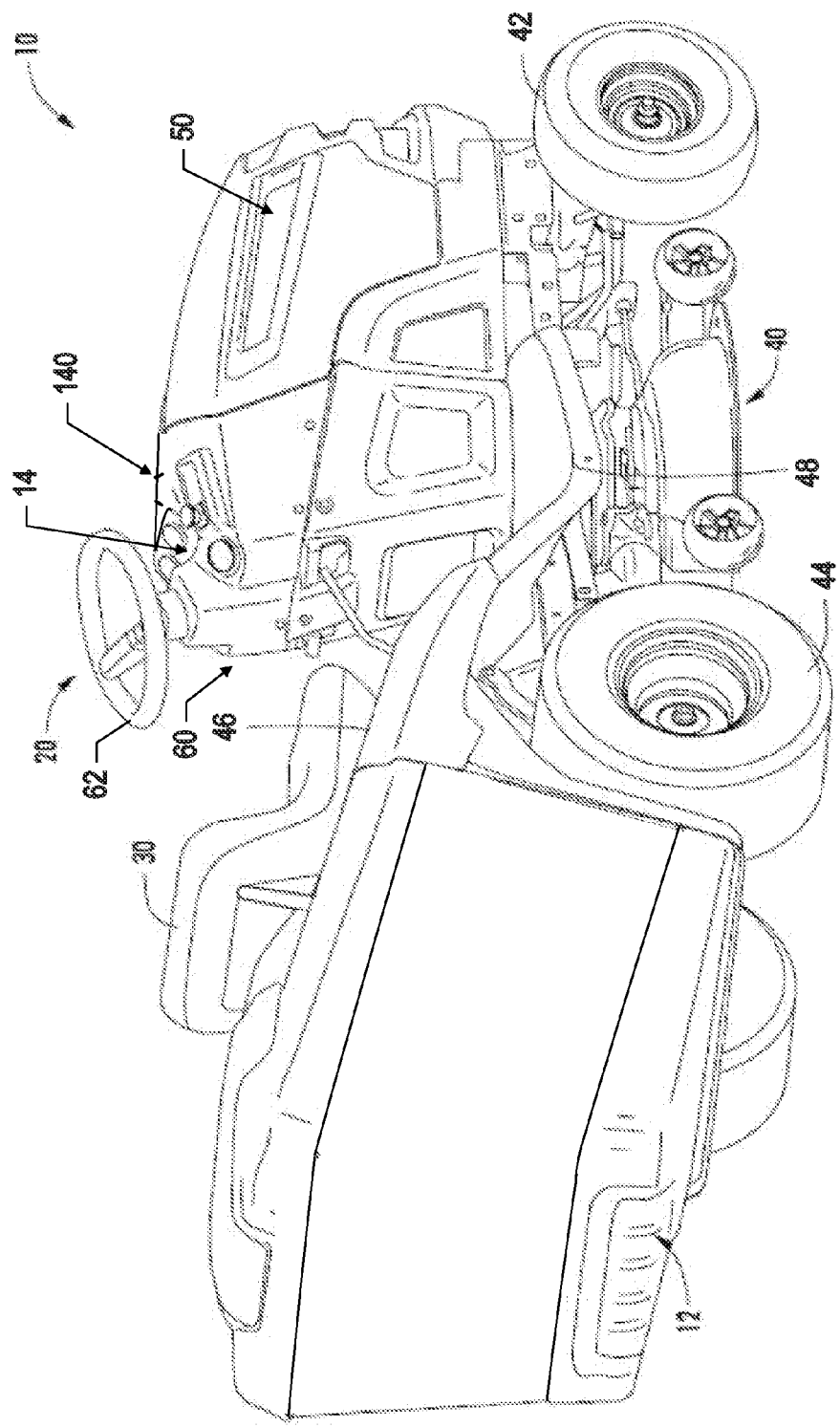
FIG. 1B illustrates a perspective view of the riding lawn care vehicle according to an example embodiment.

FIG. 1, which includes FIGS. 1A and 1B, illustrates an example of a riding lawn care vehicle 10. The riding lawn care vehicle 10 may include an information panel 14 displaying operational information regarding the riding lawn care vehicle 10. As shown and described herein, the riding lawn care vehicle 10 may be a riding lawn mower (e.g., a lawn tractor, front-mount riding lawn mower, zero-turn riding lawn mower, and/or the like). However, other example embodiments of riding lawn care vehicles may be configured or otherwise equipped to handle snow removal, brush cutting, tilling or other lawn care-related activities.

FIG. 1A illustrates a side view of the riding lawn care vehicle 10 and FIG. 1B illustrates a perspective view of the riding lawn care vehicle 10. The riding lawn care vehicle may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear or front portion of the riding lawn care vehicle 10. The operator may sit on the seat 30, which may be disposed to the rear of the steering assembly 20 to provide input for steering of the riding lawn care vehicle 10 via the steering assembly 20. A sensor may be included that detects whether or not an operator is currently sitting in the seat 30. Such a sensor may be, for example, an electromechanical switch located within or just beneath the seat surface and communicably coupled to a central computer, electrical system, or other control system.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the front wheels 42 and/or the rear wheels 44 may have a shielding device positioned proximate thereto in order to prevent material picked up in the wheels from being ejected toward the operator. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control related components such as one or more speed controllers, cutting height adjusters and/or the like. Some of the controllers, such as the speed controllers, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the steering assembly housing 60, the steering wheel 62 and/or the fender 46 may include gauges, displays and/or other user interface components. As such, for example, user interface components may be provided to indicate or display information or notifications to the operator regarding operational parameters related to the operation of the riding lawn care vehicle 10, parameters related to predefined alerts or events, or any other condition where the operator should be alerted. For example, the information may relate to any of various aspects including parameters related to cutting deck operation, engine operation, run time, work time, etc.

Figure 2:
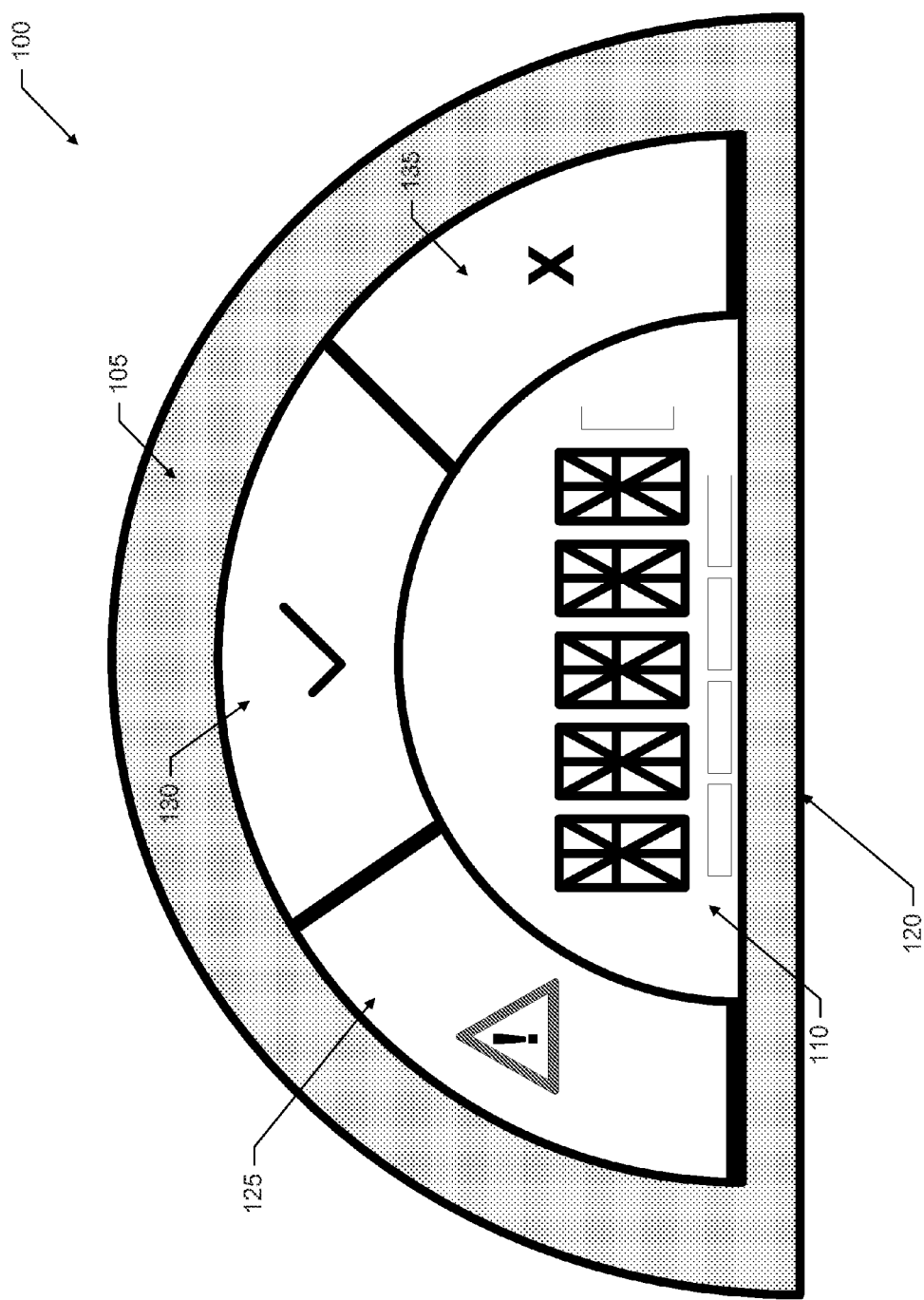
FIG. 2 illustrates portions of an indicator system of a power equipment device according to an example embodiment.

In an example embodiment, one or more these gauges, displays and/or other user interface components may include an indicator system 100 mounted to the riding lawn care vehicle 10. The indicator system 100, an example of which is shown in FIG. 2, may include an illumination element 105, one or more buttons or indicator elements 125, 130, 135, and/or a display screen 110. Components of the indicator system 100 may be housed together in housing 120 and may be connected with processing circuitry. In an example embodiment, the housing 120 may include contacts via which connection may be made to power systems of the riding lawn care vehicle 10 and/or via which connection may be made to a sensor network of the riding lawn care vehicle 10.

In one embodiment, the illuminating element 105 includes a light source that surrounds a periphery of the display screen 110. For example, as is illustrated in FIG. 2, the illuminating element 105 may be a circular or semi-circular light that completely surrounds the display screen 110 located near the center of the circle or semi-circle.

In another embodiment, the illuminating element 105 may not completely surround the display screen, and instead may be disposed about a portion of the display screen. In yet another embodiment, the illuminating element 105 surrounds or is disposed about at least a portion of one or more buttons 125, 130 and/or the indicator element 135. For example, in an embodiment, the illuminating element 105 surrounds the buttons 125, 130, the indicator element 135 and the display screen 110 as illustrated in FIG. 2. It should be understood that there may be multiple illuminating elements included with the indicator system 100 and the present disclosure should not be limited to only having a single illuminating element 105. If multiple illuminating elements 105 are included, one or more of the plurality of illuminating elements 105 may operate independently from each other and may be disposed around (or surround completely) the buttons, 125, 130, the indicator element 135, the display screen 110, any other elements, and/or any combination thereof. In some embodiments, the illuminating element 105 may not surround any element, and in one embodiment could be a light of any shape proximate to one or more elements (e.g., buttons, display screen, etc.) or a stand-alone light placed on the riding lawn mower 10.

The light source of the illuminating element 105 may be light emitting diodes ("LEDs"), a florescent light, an electroluminescence (EL) light, backlighting systems, light tubes, and/or any other means for providing light. In one embodiment, the illuminating element 105 is made up of a plurality of light sources, such as a series of LEDs, positioned in a narrow strip that surrounds the display screen 110. A transparent or semi-transparent material may be placed of the series of LEDs so that the illuminating element 105 has the appearance of the solid consistent ring of light around the perimeter of the display screen 110 and any associated buttons 125, 130.

As will be discussed in more depth later with regard to FIGS. 7-17, the illuminating element 105 is configured to glow in a predetermined manner (e.g., a predetermined color, steadily illuminated, gradually illuminated, flashing at a predetermined interval, rate, or sequence, etc.) depending on the condition detected by the outdoor power equipment's electrical system. For example, when a particular condition is detected, the illuminating element 105 may illuminate as any one of a plurality of colors, such as green, red, blue, yellow, any other color, or any combination thereof, and the display screen 110 may display some more detail about the particular condition that prompted the illumination of the illuminating element 105. Each color may be associated with a different condition or type of condition. For example, the indicator may glow red whenever there's an immediate safety issue detected, and the display screen 110 may, at the same time, present text about the safety issue (e.g., "engine temp too high," "tractor riding on too steep of an incline," "no operator is detected," etc.). In another example, the riding lawn mower 10 may be configured to communicate or pair with the operator's mobile phone via a short range connection (e.g., Bluetooth® or the like), and the illuminating element 105 may glow blue whenever the operator is receiving an incoming call on his cellular telecommunications device, in which case the display screen 110 may display the name or number of the person calling while the illuminating element 105 is glowing blue.

In still other embodiments, the illuminating element 105 may be configured to flash or otherwise change brightness levels based on the particular type of condition. For example, the illuminating element 105 may glow solid when communicating information that does not require an operator response, but may flash when the operator needs to take some sort of immediate action. The speed of the flash may indicate the urgency of the information being communicated on the display.

In one embodiment, the operator can preset which manner of illumination (e.g., what colors) is associated with which alert or notification. The operator may also be able to set the brightness of the illuminating element 105. For example, the operator may adjust the illuminating element brightness into a day mode where the illuminating element 105 is brighter than a night mode where the illuminating element 105 may be dimmer.

In one embodiment of the invention, the illuminating element is configured so that it gradually illuminates and/or fades when it lights up, turns off, and/or changes colors. This gradual illuminating and fading provides may provide a more pleasant appearance for the operator.

As mentioned above, various conditions (e.g., triggers, events, conditions, states, faults, etc.) could cause the illuminating element 105 to illuminate. Examples of predetermined conditions are general faults (e.g., low fuel, service engine interval expires, the blades need sharpening, low oil/oil pressure, tire pressure error, engine heat warning, transmission heat warning, RPM too high or too low, blade speed too high or too low, parking brake engaged or disengaged, grass collector full or clogged, etc.), safety faults (e.g., steep incline, no operator detected, parking brake disengaged, child nearby, roll-over-protection not properly positioned, discharge shoot not properly positioned, etc.), incoming electronic communications alerts (e.g., incoming phone call, incoming email/text message, incoming short range communications, etc.), or any other alerts/notifications (e.g., weather alerts/notifications, internet alerts, GPS notifications, garage door open, etc.). The conditions could be predefined by the operator, the riding lawn care vehicle manufacturer, or some other entity. Whenever a condition occurs, the illuminating element 105 illuminates in any one of a plurality of colors providing an alert or notification to the operator and the display simultaneously displays a visual message to the operator providing more detail about the particular condition, as will be discussed in more depth later with respect to FIGS. 7-17.

In one embodiment, the illuminating element 105 is configured to display light to the operator according to varying brightness, patterns of illumination (e.g., flashing, blinking light patterns), gradual illumination or dimming (rather than a simple on/off), any other way to present light to the operator, or any combination thereof. For example, an alert could be a red flashing light that blinks three times which may indicate that the fuel tank is three quarters empty. As another example, an alert could be a gradual fading in and out of an orange light as the ground underneath the riding lawn care vehicle becomes gradually steeper. In other examples, the illuminating element 105 may be a red indicator light that could be a slow red flash for non-critical functions (e.g., low on fuel or service engine) and a fast red flashing for safety warnings or start sequence issues. There could also be a combination of colors used, such as an orange and red intermittently blinking alert, or that the left half of the illuminating element 105 may glow green while the right half of the illuminating element 105 may glow red which may indicate, for example, that a tire on the right half of the riding lawn care vehicle 10 is low on air pressure.

In another embodiment, the illuminating element 105 may gradually illuminate from one color to another color indicating one state to another state, respectively. For example, at least a portion of the illuminating element 105 may start out as dark green indicating that the fuel tank is full, and as the fuel tank gradually is consumed during operation of the riding lawn care vehicle 10, the illuminated color becomes closer to dark red. As such, when the fuel tank is half empty, the color of the illuminating element 105 may be orange (i.e., half green-half red), and so the operator knows approximately how much fuel he/she is in the tank at any point in time based solely on the color of the illumination element 105. The operator will know that the closer to the color red, the more empty the fuel tank is and the closer to the color green, the more fuel the tank may have.

It should be understood that the indicator system 100 and/or the illuminating element 105 could also present sounds or any other way to gather the operator's attention according to some embodiments. In one embodiment, the illuminating element 105 could present sounds instead of presenting a color light to the operator.

As mentioned above, the indicator system 100 may also include one or more buttons, such as an override button 125, a mode select button 130, and/or any other type of button allowing for any other functionality. The override button 125 may allow for a user to override one or more alerts presented by the indicator system 100. For example, if an alert is presented where an override is allowed, such as a low fuel alert, the operator may acknowledge such alert and remove the alert by depressing the override button. This may change the illumination color from a fault color (such as red) back to a no-fault or "ready" mode color (such as green). There may be only certain events or conditions for which the override button 125 is allowed. For example, the override button 125 may only be allowed to override general faults and other non-safety alerts, such as low fuel, incoming call, service needed, low oil, other general maintenance notifications, alerts not related to operations of the riding lawn care vehicle (such as incoming call or weather notifications), or any other alerts or notifications as may be predefined from the manufacturer (or other entity).

Once an operator depresses the override button 125 where an override is allowed for the outstanding alert or notification, the operator may hold the override down for a predetermined time period and, in response thereto, the outstanding alert or notification is temporarily or permanently removed such that the illumination element no longer displays the color associated with such outstanding alert or notification. The indicator system 100 may then determine if any other alerts or notifications are detected and may display any detected alert or notification other than the overridden alert or notification. According to one embodiment, the operator may be allowed to temporarily override the outstanding alert or notification and set a time for such overriding to expire. This allows the operator to not forget about the outstanding alert or notification completely, such as if the operator wants to be reminded of the alert in a predetermined time in the future, when the operator turns off the engine or any other time in the future. The override functionality of the override button 125 is discussed more later with regard to the methods 700, 1000 of FIGS. 7 and 10, respectively.

The override button 125 may also (or alternatively) have other functionality, such as functioning as a reset button or an "enter" button. The reset functionality allows for an operator to reset the indicator system 100. This may be useful in case the operator wants to reboot the indicator system 100 or if the operator would like to reset certain functions of the indicator system 100. The reset functionality may also be useful in a user interface to function as resetting certain values back to zero or some other number. For example, if the operator wants to reset the tripometer to zero, the operator would hold the reset button down for a predetermined time while in the trip mode and the tripometer would reset back to zero. The reset button could also be used in calibrations functions or other functions or features.

The "enter" functionality of the override button 125 may be used as a selection operator in cooperation with a user interface that may be employed with the indicator system 100. For example, if the operator is scrolling through menus of a user interface of the indicator system 100, the operator can use the override button 125 as the button to select which option the operator wishes to perform. The operator could also use the override button 125 to acknowledge receipt of alerts. For example, if a message pops up on the display with an option to hit "OK," the operator can use the override button 125 to select the "OK" button. Other operations of the enter functionality of the override button 125 are also possible.

Referring now to the mode select button 130, the mode select button 130 allows for an operator to toggle what is displayed in the display screen 110. Various modes that are possible include, but are not limited to, RPM mode, time mode, temperature mode, hour meter mode, trip time mode, and inclinometer mode. For RPM mode, the display screen 110 would show the engine's revolutions per minute ("RPMs") of the riding lawn care vehicle. For time mode, the display screen 110 presents the current time, which may be a connection to an atomic clock or an on-board clock. In temperature mode, the display screen 110 displays the current temperature received from a temperature sensor on the riding lawn care vehicle or from an internet site. In hour meter mode, the display screen 110 shows how long the riding lawn care vehicle has been in operation over the life of the riding lawn care vehicle. In trip time mode, the display screen 110 displays the amount of time that the riding lawn care vehicle has been operating in the current operating session. For the inclinometer mode, the display screen 110 presents how steep the current incline that the riding lawn care vehicle is on. Other modes are also possible and may be toggled to active using the mode select button 130.

Other buttons may also be employed on the indicator system 100. Additionally, there may be other indicators other than the illumination element 105. For example, as illustrated in FIG. 2, an indicator element 135 may provide to the operator an indication of one or more features that are currently active. For example, according to one embodiment, the indicator element 135 could indicate that the riding lawn care vehicle 10 is currently in reverse mow mode. The indicator element 135 could also provide an indication of other active features, such as if the headlights are left on or if the engine is currently on. The indicator element 135 could further provide other information to the operator, such as if the riding lawn care vehicle is operating at an efficient rate, if a timer has expired, or any other preprogrammed information. In one embodiment, if the riding lawn care vehicle is operating at an optimum rate, the illuminating element 105 glows a first color, such as green, and the harder the riding lawn care vehicle 10 must work (or the more inefficient the riding lawn care vehicle operates) the more the illuminating element 105 glows a second color, such as red. Thus, if the riding lawn care vehicle 10 is operating at a medium efficiency, the illuminating element 105 would glow color that is a combination of 50% of the first color and 50% of the second color, such as orange.

The display screen 110 presents various textual information to the operator, such as operational data (e.g., voltages, RPMs, trip timer, etc.), weather information, safety information, fault data, time/date information, etc. For example, if the indicator system 100 is in RPM mode, the display screen 110 presents the current RPMs of the riding lawn care vehicle 10. Also, the display screen can present various status information of the indicator system 100, such as "READY," "FAULT," "ENGINE BRAKE FAULT," "LOW FUEL," "NO OPERATOR," or "BLADES ON."

The display screen 110 may be a liquid crystal display ("LCD"), a plasma display panel ("PDP"), an electroluminescence ("EL") display, a fluorescent display ("VFD"), light emitting diode ("LED") display, or any other display device. In one embodiment, the display screen 110 can be a touchscreen to allow an operator to operate the screen by the touch of the finger/stylus on the screen, and in such embodiment, any buttons can be buttons displayed by software and activated by touching the display screen 110. The display screen may be connected with circuitry with the indicator system 10 so that information discussed herein can be displayed on the display screen 110.

In one embodiment, the display screen 110 is mounted within the housing 120. It should be understood, however, that the display screen 110 need not be located within the housing 120 of the indicator system 100, and, as will be described later, one embodiment is directed to having a display screen located separate from the housing and remote from the illuminating element 105. For example, the display screen 110 could be located on or adjacent to the operator's seat while the illuminating element 105 may be located in the dash 140 of the riding lawn care vehicle 10. In another embodiment, the indicator system 100 may have two or more display screens—one within the housing 120 and at least another display located remotely from the housing 120, such as being located on the fender 46 of the riding lawn care vehicle 10. Embodiments of separate display are discussed in more depth below with regard to FIGS. 5-6 and 13-15.

Figure 3A:
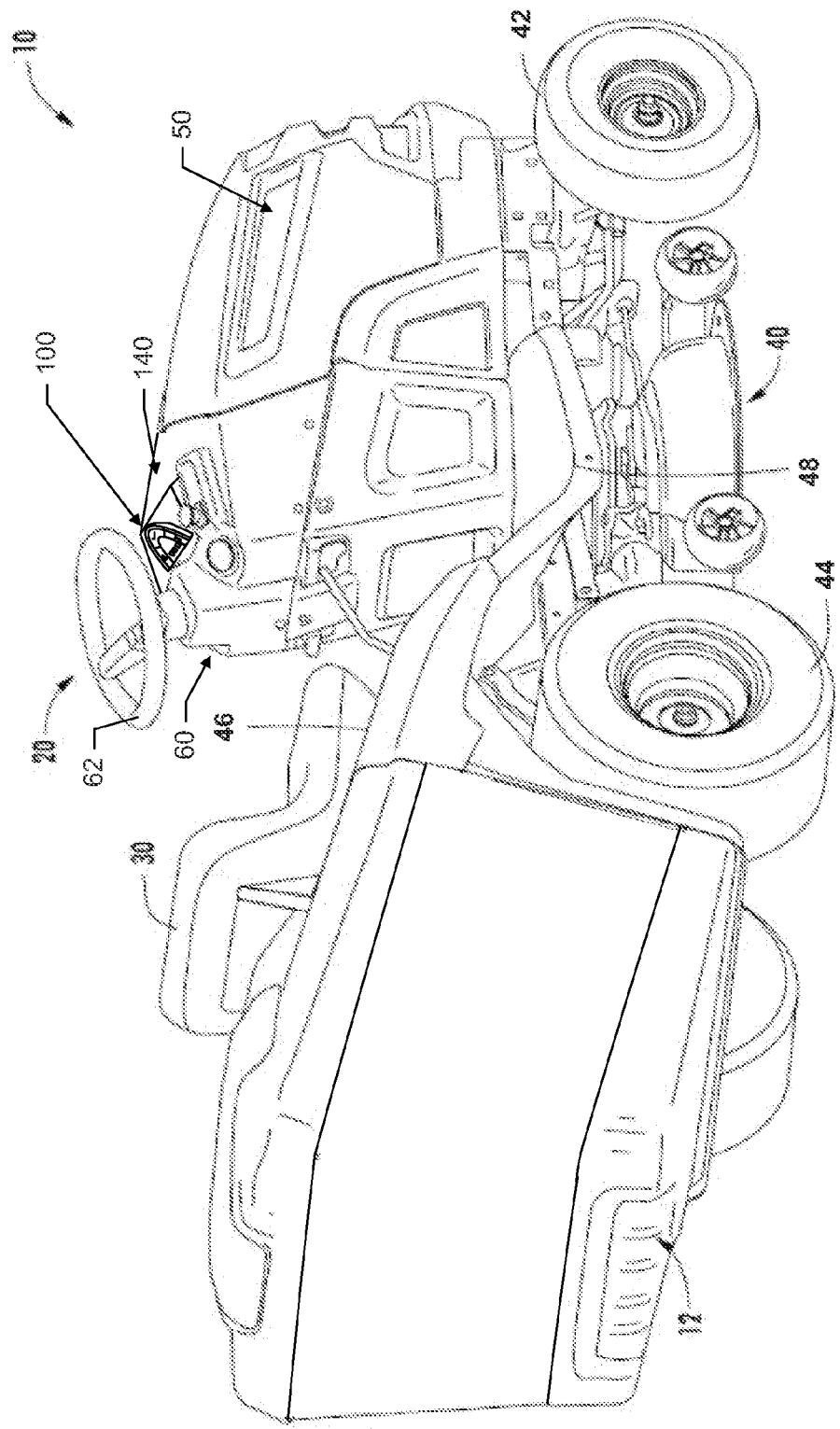
FIG. 3A illustrates a perspective view of a riding lawn care vehicle with the indicator system of FIG. 2 according to an example embodiment.
Figure 3B:
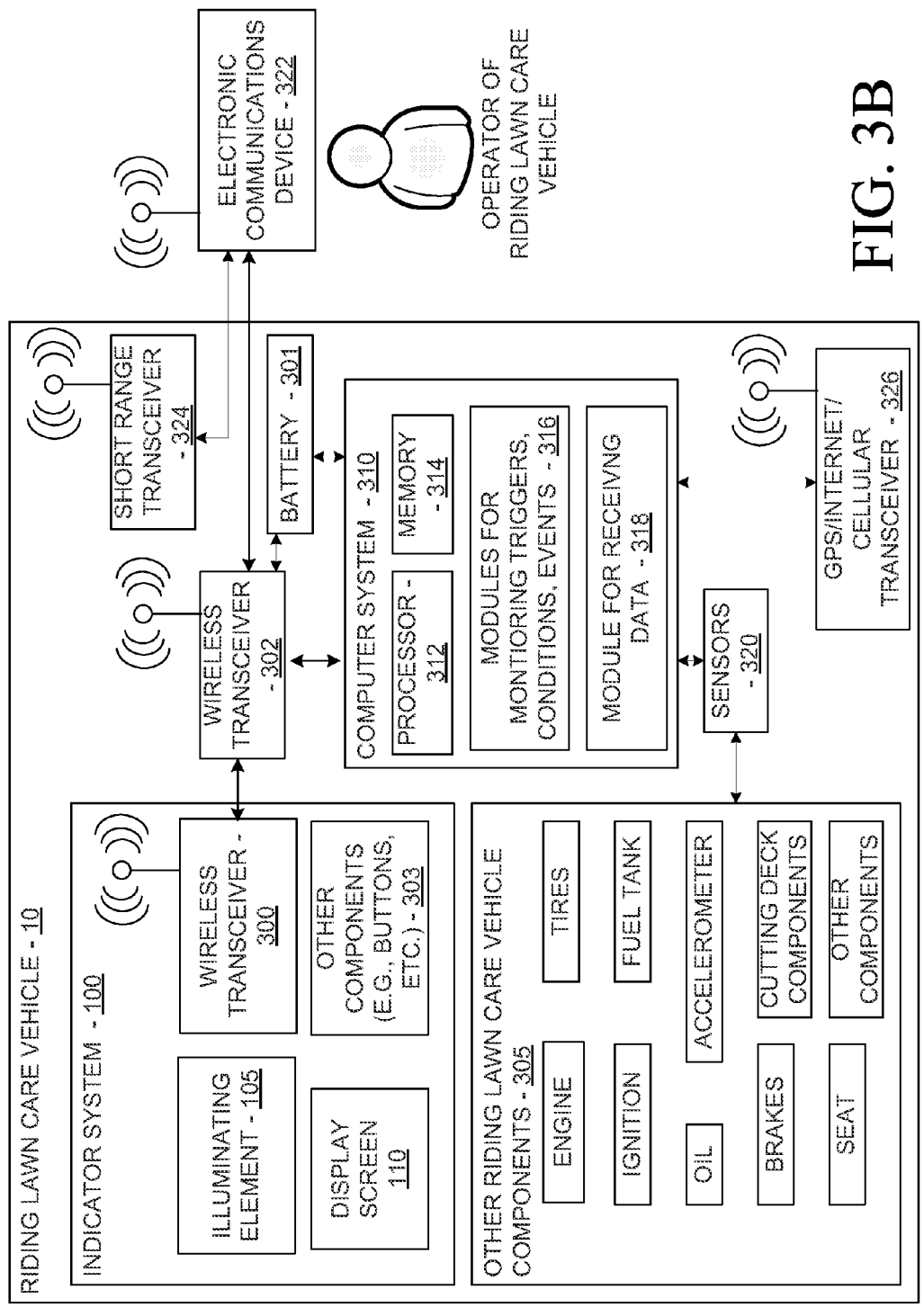
FIG. 3B illustrates a block diagram of a system of a riding lawn care vehicle with the indicator system according to an example embodiment.
Figure 4A:
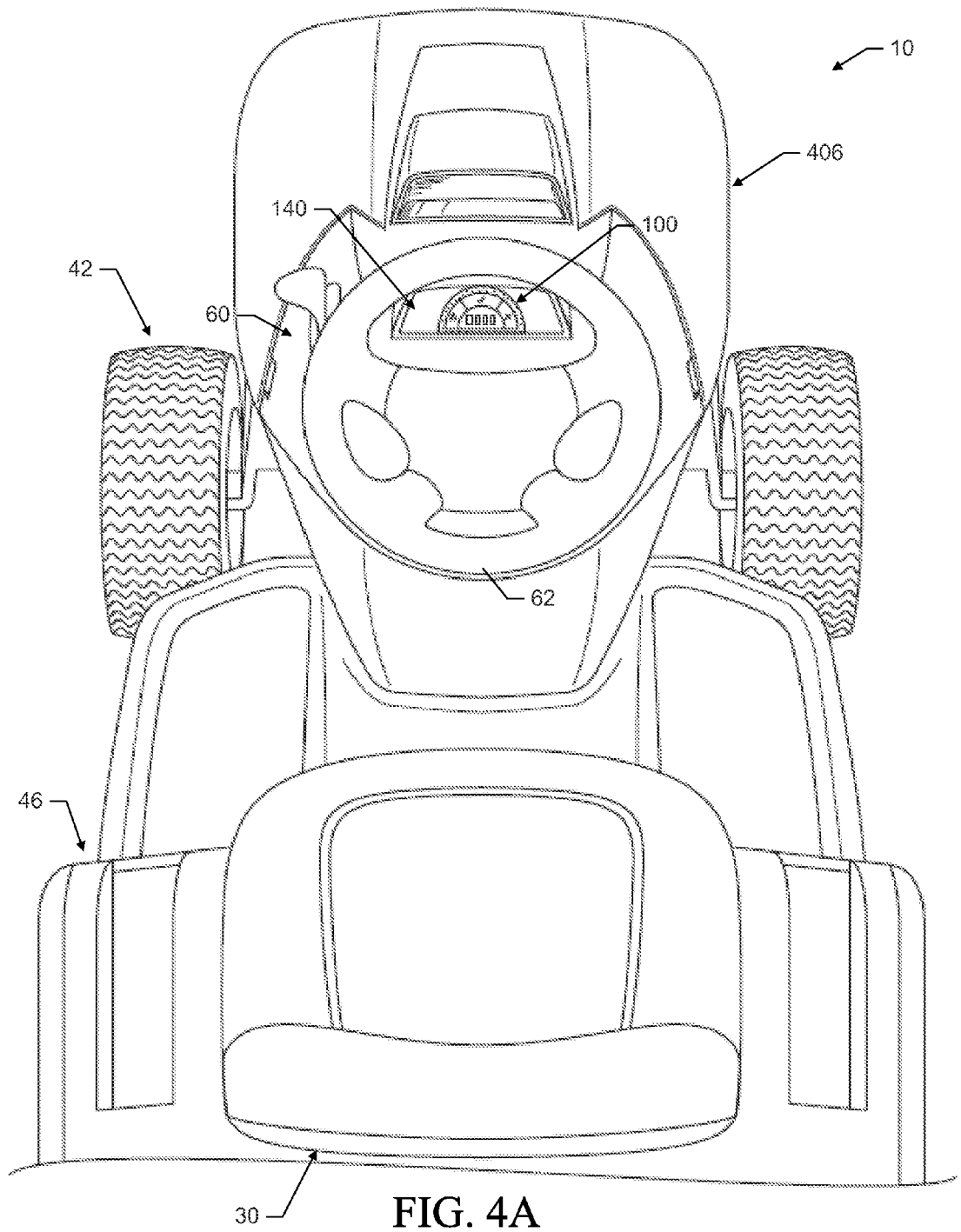
FIG. 4A illustrates a top view of a riding lawn care vehicle with the indicator system mounted to the steering assembly according to an example embodiment.

FIGS. 3A and 4A illustrate an example embodiment of the riding lawn care vehicle 10 with the indicator system 100 installed on a portion of the steering assembly housing 60 that is forward of the steering wheel 62. FIG. 3 illustrates the riding lawn mower of FIG. 1 with the indicator system 100 located on the dash 140 and installed on the steering assembly housing 60. FIG. 4A illustrates a top view of the riding lawn care vehicle of FIG. 3. As illustrated in FIGS. 3 and 4A, the riding lawn care vehicle 10 includes the indicator system 100 of FIG. 2 and the indicator system 100 is positioned forward of the steering wheel 62 to be in plain view of the operator while the operator is sitting in the seat 30.

Figure 4B:
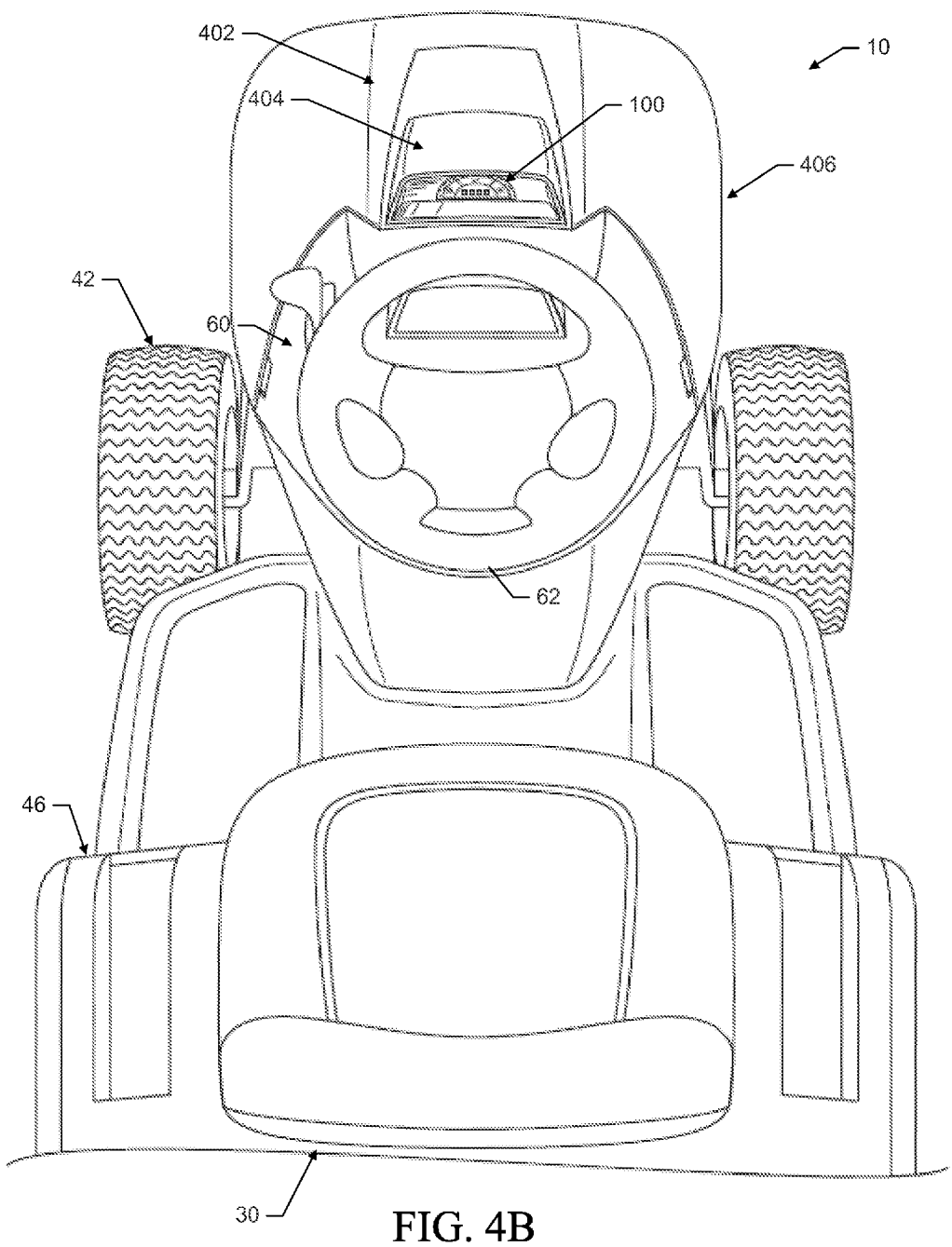
FIG. 4B illustrates a top view of a riding lawn care vehicle with the indicator system mounted within the hood handle according to an example embodiment.

While FIGS. 3A and 4A illustrate that the indicator system 100 is installed on the dash 140 of the steering assembly housing 60, it should be appreciated that the indicator system 100 could alternatively be positioned at any of a plurality of other locations on the riding lawn care vehicle 10. For example, as shown in the illustrative embodiment of FIG. 4B, the indicator system 100 may be disposed under or within a portion 402 of the hood where the hood handle 404 is disposed. This configuration of FIG. 4B allows the indicator system 100 to be at least partially shielded from direct sunlight by the hood handle 404 and also be substantially visible without visual obstruction from the steering wheel 62 while an operator is sitting in the seat 30 of the riding lawn care vehicle 10. In some embodiments, the hood handle 404 may be used to remove the housing 406 from around the engine so that the engine can be accessed. The hood handle 406 may thus operate to be configured to be lifted vertically and also be a shield for the indicator system 100. Since the indicator system 100 is disposed in the hood handle, as illustrated in FIG. 4B, the indicator system 406 is within the eyesight of the operator while the operator is in the operator's seat 30, especially if the operator is looking forward over the front of the riding lawn mower 10.

Figure 5A:
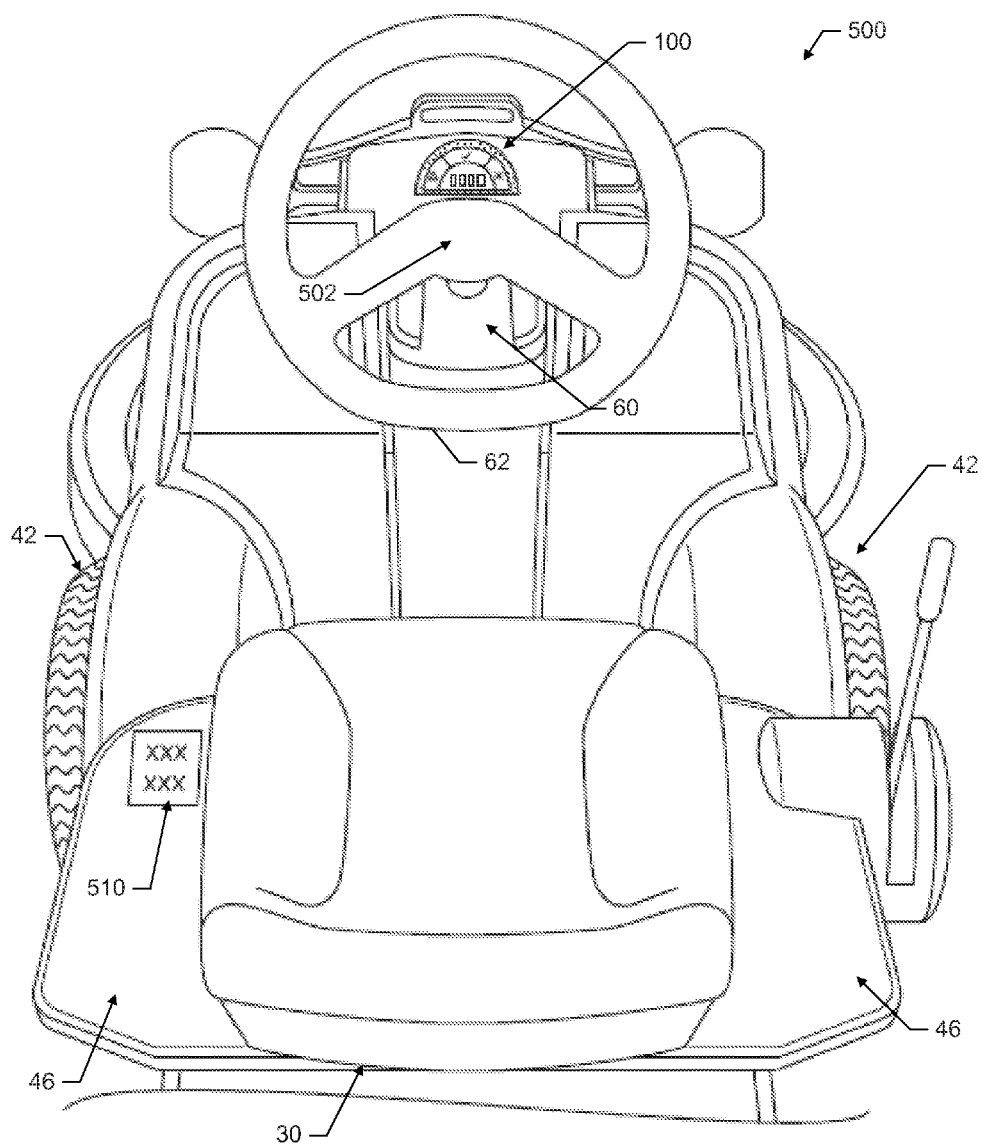
FIG. 5A illustrates a top view of a riding lawn care vehicle with an indicator system according to an example embodiment.
Figure 5B:
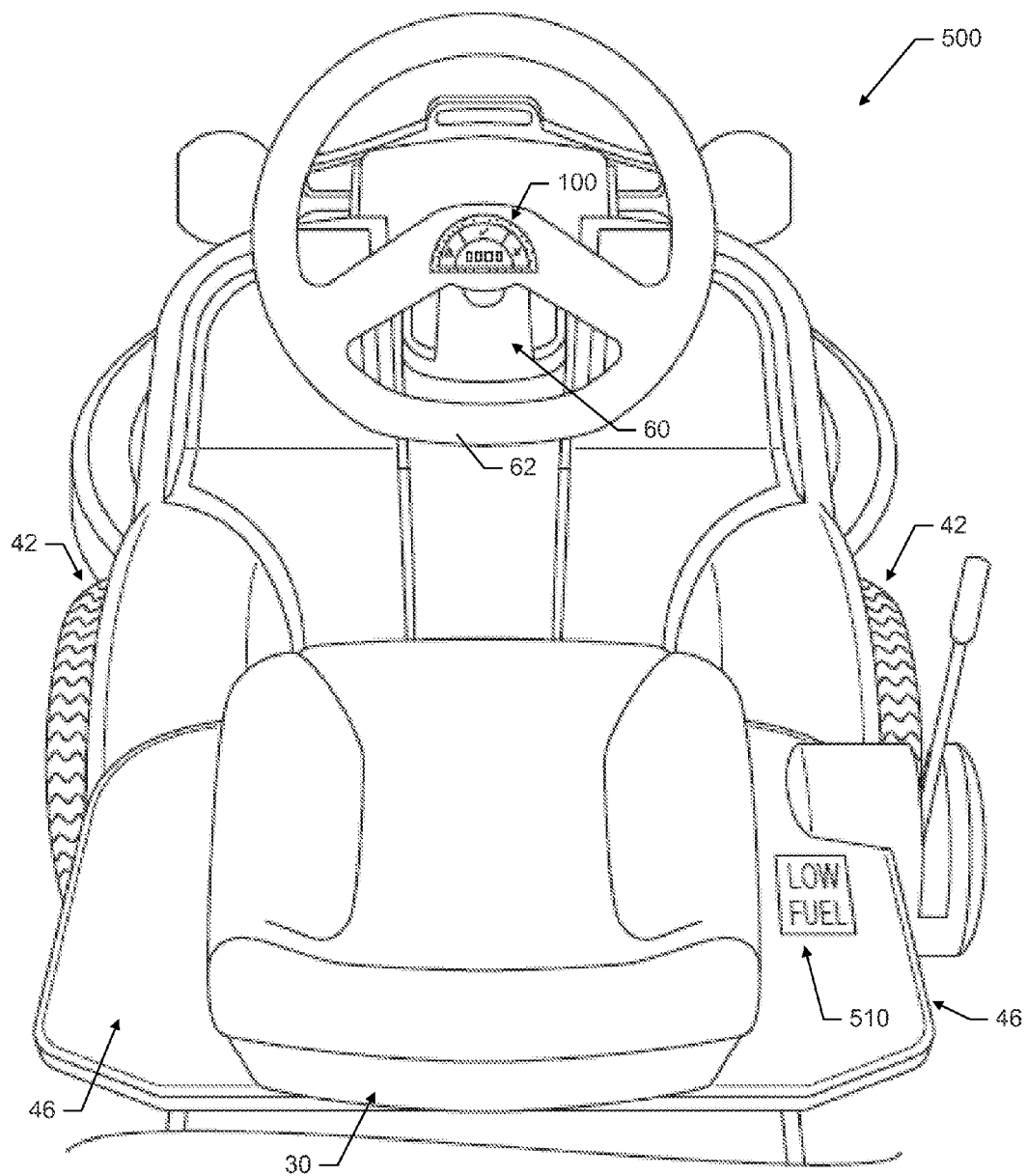
FIG. 5B illustrates a top view of a riding lawn care vehicle with an indicator system according to another example embodiment.

According to other embodiments, the indicator system 100 may be disposed on other types of riding lawn mowers and/or at other positions. For example, FIGS. 5A-5B illustrate the indicator system 100 being disposed of a riding lawn mower 500 that does not have the engine disposed in front of the steering column. In such riding lawn mower, space to mount the indicator display may be more limited than the riding lawn care vehicle 10 of FIGS. 3, 4A and 4B. Nonetheless, the indicator system 100 can be disposed in various locations of the riding lawn mower 500 of FIGS. 5A-5B. For example, FIG. 5A illustrates the indicator system 100 being disposed forward of the steering wheel 62 on a steering assembly housing 60 of a riding lawn mower 500. According to another example embodiment, the indicator system 100 could be positioned on the steering wheel 62 itself (e.g., at a center 502 portion of the steering wheel 62 or otherwise positioned to fit within the circumference of the steering wheel 62 as shown in FIG. 5B). The indicator system 100 can be integrated into the steering wheel 62 or be removable from the steering wheel 62 according to some embodiments.

FIG. 3B illustrates a block diagram of a riding lawn care vehicle with an indicator system 100 having a wireless interface. The indicator system 100 may communicate with a computer system 310 (or other electrical system such as an application-specific integrated circuit or the like) that, along with a system of sensors and/or other electronics, determines the alerts and/or other data to be presented by the indicator system 100.

According to the embodiment illustrated in FIG. 3B, the computer system 310 may be located on a portion of the chassis or frame such that the computer system 310 is not proximate to the indicator system 100. In such embodiment, the computer system 310 may communicate wirelessly with the indicator system 100. The computer system 310 may receive data from various components 305 (e.g., engine, ignition, tires, fuel tank, oil, an on-board accelerometer to determine incline levels, brakes, seat, cutting deck components, wireless transceiver 302 and/or other components) via sensors 320 or other devices. The computer system 310 includes a processor 312 and memory 314 which is configured to communicate with a module for monitoring conditions 316 and a module for receiving data 318. The module for receiving data 318 may receive data from the sensors 320 or from a wireless transceiver 302. With such data, the module for monitoring conditions 316 determines if an alert should be triggered based on predetermined thresholds and determines the type of alert, including the manner by which to illuminate the illuminating element and the text or other visual graphic to display on the display screen. These modules are stored on any computer-readable medium, such as memory 714 or memory (not shown) of the indicator system 100.

In one embodiment, the memory 714 includes a table that correlates each type of condition with a particular illumination manner for the illuminating element and a particular graphic for the display screen. In such an embodiment, when the receiving data module 318 receives information from a sensor about a change in a condition, the condition monitoring module 316 looks in the memory 714 to determine whether the change in condition warrants a change in the indicator system 100 and, if so, specifically how the illuminating element 105 should be illuminated and what text or symbol should be displayed on the display screen 110. In some embodiments, there may be a hierarchy of conditions that also may affect how the condition is displayed via the indicator system 100. For example, if there is a particularly urgent or important condition detected, then the condition may be presented via the indicator system 100 and other conditions might not be presented until the particularly urgent or important condition is cleared. Such a hierarchy or set of display rules may also be stored in the memory 714.

If an alert is generated and/or if data should be displayed, the computer system 310 may relay the alert information and/or data to the indicator system from a general wireless transceiver 302 to the indicator system's wireless transceiver 300. The indicator system's wireless transceiver 300 may then send such data to the indicator system's processor 301 which would, in turn, process the alert information and/or other data to various components of the indicator system 100, such as the illuminating element 105, the display screen 110, or other components 303. It should be understood that the wireless transceiver 302 may be mounted at any location on the riding lawn care vehicle 10, such as in the steering assembly housing 60, on a portion of the frame of the riding lawn care vehicle 10, or any other location or component of the riding lawn care vehicle 10. Additionally, it should be noted that the wireless transceiver 302 may pair and communicate with an electronic communications device, such as a cellular phone, computer/laptop/tablet, or other device which has wireless communications capabilities, via a short range network (e.g., Bluetooth®). Moreover, the riding lawn care vehicle 10 may have other wireless transceiver, such as a short range transceiver 324, a GPS/internet/cellular transceiver 326, etc. The short range transceiver 324 communicates with devices over a short range network such as two way paging "walkie-talkie" type devices. The GPS/internet/cellular transceiver 326 may be a transceiver that communicates with a GPS satellite, an internet satellite or cellular towers to receive GPS data, internet information, or cellular data, respectively. It should be understood that the wireless transceivers described herein may be any device capable of transmitting and/or receiving at least short range wireless signals, such as a Bluetooth® transceiver, radio frequency transmitter, and/or any other transmitter or receiver.

It should be understood that the indicator system may have a wired interface, as opposed to the wireless interface of FIG. 3B. In such case, the riding lawn care vehicle 10 would have wiring that connects the indicator system 100 with the computer system 310 and may also connect the wireless transceiver with the computer system 310. The wiring may be run along the chassis or frame from the computer system 310 through a hinge portion that allows the hood 52 to rotate relative to the chassis or frame. In such embodiment, the wiring may be connected on the bottom of the upper wall so as to be hidden from an operator. The wiring connects various components of the riding lawn care vehicle to a battery 301, the computer system 310 and/or other circuitry. As such the battery 301 may be connected to any element which may require electrical energy to operate. Additionally, the wiring 350 may connect any other components of the riding lawn care vehicle 10 and should not be limited to connecting the indicator system 100 with the computer system 310.

Additionally, as illustrated in FIGS. 5A-5B, the indicator system 100 may further include a display screen 510 that is separate from the illuminating element 105. The separate display screen 510 may be the only display screen of the indicator system 100 or be in addition to the previously-discussed display screen 110. The separate display screen 510 is illustrated in FIGS. 5A-5B as mounted to the left and right fenders 46, respectively, of the riding lawn care vehicle 10. However, the separate display screen 510 can be located at any other location on the riding lawn mower 500, such as on the seat, on a portion of the foot rest, or any other location where an operator can view the display screen when seated.

The separate display screen 510 may be connected with circuitry (or via a wireless connection) that is also connected with the illuminating element 105 such that when the illuminating element 105 is providing an alert or notification to the operator, the operator may direct his attention to the separate display screen 510 which may provide more detail about the alert or notification. For example, as illustrated in FIG. 5B, when a low fuel alert occurs, the illuminating element 105 illuminates as a predetermined color, e.g., red, and the separate display screen 510 displays text indicating that that the vehicle has "Low Fuel." It should be understood that this status information may also (or in lieu of) be displayed by the display screen 110 that is immediately proximate to the illuminating element 105.

Figure 6:
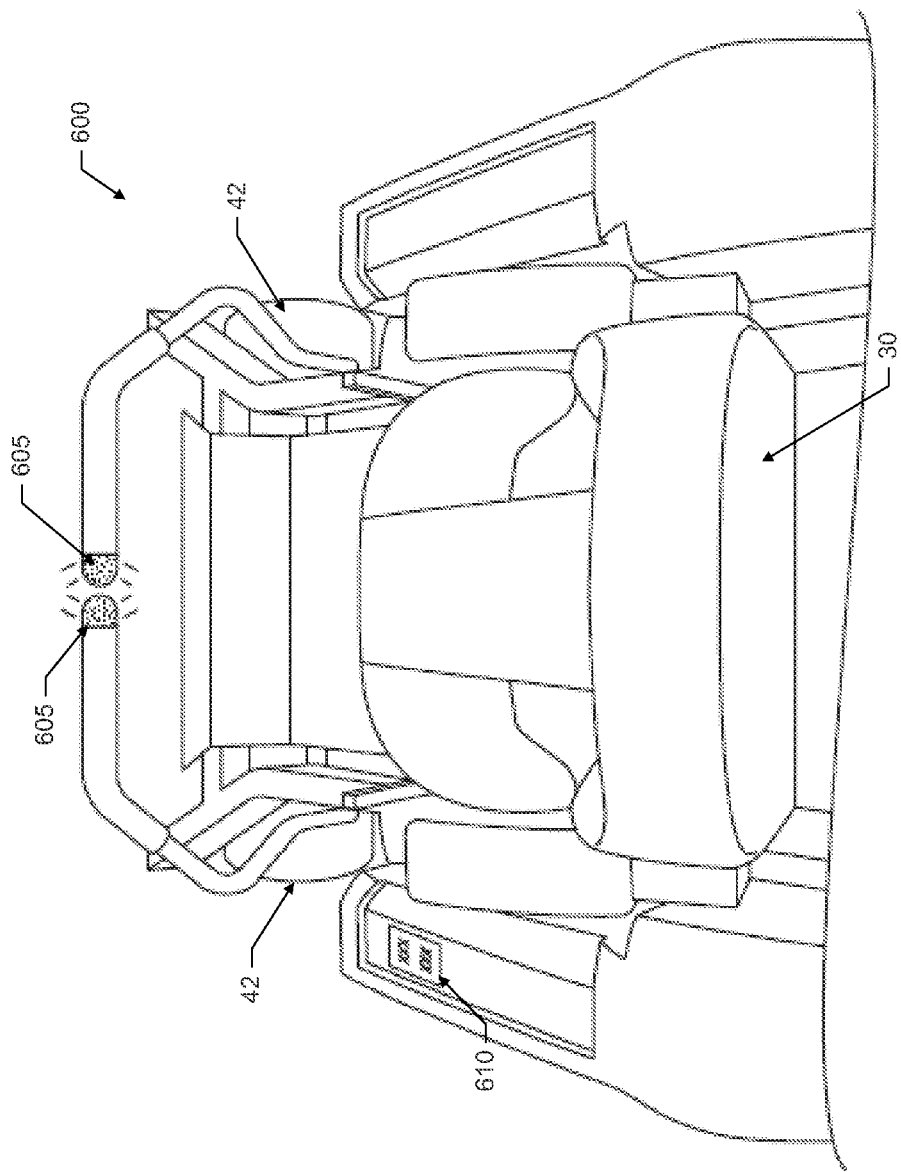
FIG. 6 illustrates a back perspective view of a riding lawn care vehicle with an indicator system according to an example embodiment.

FIG. 6 illustrates a riding lawn mower with an indicator system 600 according to another embodiment. The indicator system 600 includes illuminating elements 605 and a display screen 610. The illuminating elements 605 light-up a predetermined color dependent on the type of condition occurring. At the same time that the illuminating elements 605 are illuminated in a particular manner, the display screen 610 may provide more details about the current condition or event that prompted the illumination of the illuminating elements 605 in that particular manner. This allows a riding lawn mower 600 with limited space around the steering controls to direct the user's attention to a display screen 610 mounted to another area of the riding lawn mower 600.

Figure 7:
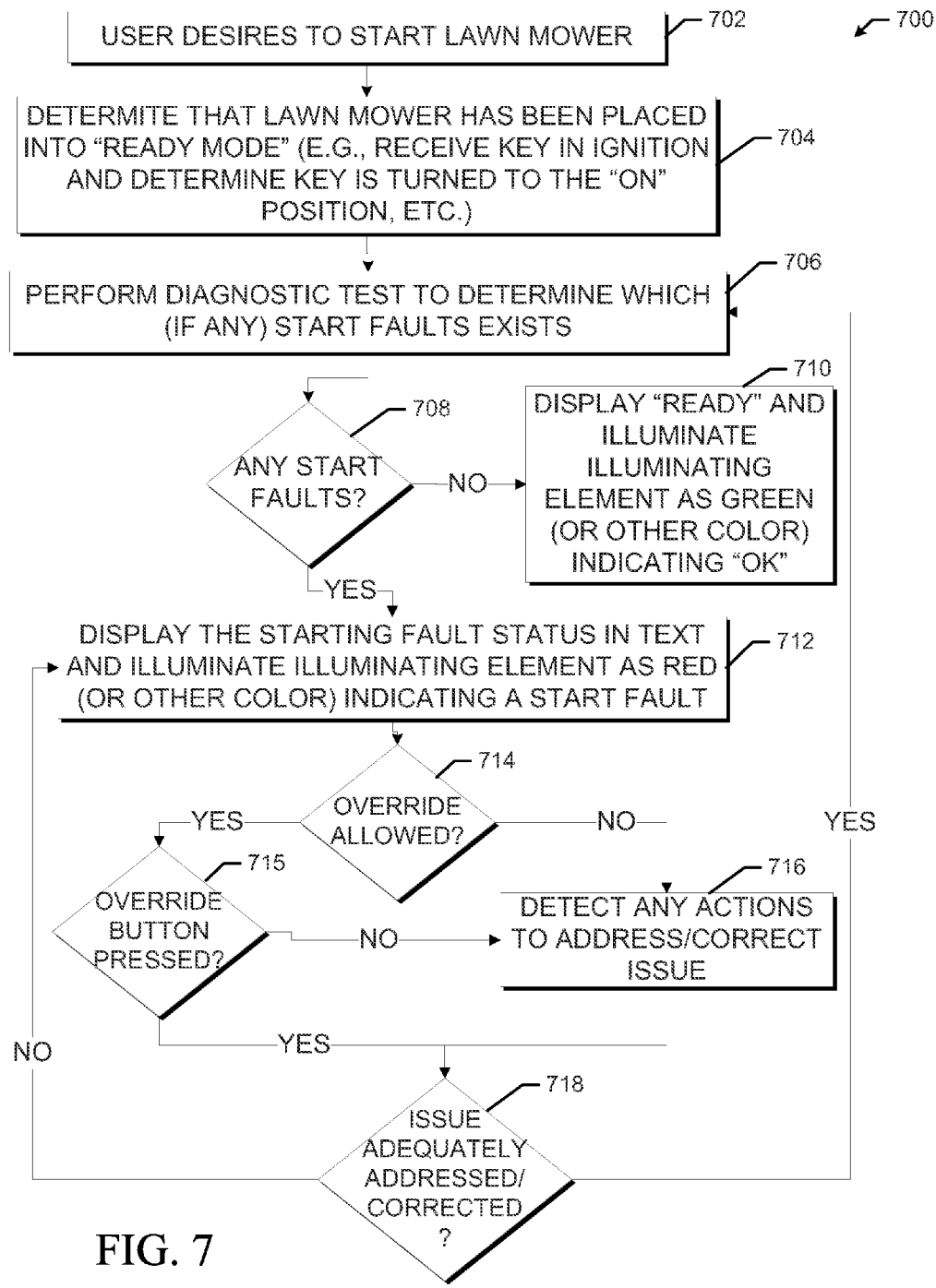
FIG. 7 illustrates a block diagram of a method of operation of the indicator system of the riding lawn care vehicle according to an example embodiment.

FIG. 7 is a block schematic diagram of a method 700 of operation of the indicator system 100 according to various embodiments. In block 702, an operator of a riding lawn care vehicle desires to start the engine of a riding lawn care vehicle. The engine of the riding lawn care vehicle 10 may be started by using a key and an ignition. The ignition of the riding lawn care vehicle 10 may have certain positions that the key can be turned to once the key is inserted therein. For example, if the operator wants to power the headlights of the riding lawn care vehicle 10, the operator inserts the key into the ignition and turns the key to a certain amount until such position is reached. If the operator would continue to turn the key, the key would then be in the cranking position, whereby the engine would be started. Thus, the key can be turned to certain positions in the ignition to allow certain modes or functions, such as a "ready" mode for powering certain electrical components of the riding lawn care vehicle 10, a "cranking" mode for cranking the engine, and the like.

Referring back to block 702, the operator may begin the engine starting process of the riding lawn care vehicle by first placing the riding lawn care vehicle into "ready" mode, as shown in block 704. In one embodiment, this can be done buy the operator inserting the key into the ignition and turning key to an "on" or "ready" position. In another embodiment, the riding lawn care vehicle can be placed in "ready" mode merely by inserting the key or by taking some other action. As briefly mentioned above, such a "ready" mode does not start the engine of the riding lawn care vehicle but does "wake up" certain electrical components such that electricity is supplied to certain parts of the riding lawn care vehicle and certain diagnostics are performed. In one embodiment, the key is turned such that electricity is supplied to a diagnostic system and other parts of the riding lawn care vehicle so that the diagnostic system can perform diagnostic tests on the riding lawn care vehicle to determine any faults that should or must be corrected prior to starting the engine. Some other parts of the riding lawn care vehicle may also be powered during the "ready" mode, such as a wireless short range transceiver (e.g., a Bluetooth® transceiver), a GPS transceiver, any other transceivers, and/or any other element (other than the engine) which works with the indicator system 100.

In block 706, a determination may be made as to whether any starting faults have occurred. Examples of starting faults may include the brakes not being engaged, if the operator has not been detected, or if the blades are on. Other starting faults may include low fuel, service/check engine warning, sharpen blades fault, low oil/oil pressure fault, tire pressure fault, engine heat warnings, transmission heat warnings, steep incline fault, no operator fault, parking brake not engaged, transmission not in neutral, brake not engaged, safety devices not engaged, cutting element too loose, operator not qualified to operate machine, battery too low, implement not connected properly, or any other faults or alerts. The starting fault determination may be performed by various diagnostics and sensors via the diagnostic system, such as determining if the blades are on, if the brake is engaged, or any other faults that may be generated at start up. For example, if the operator is determined to not be in his seat by the diagnostic system checking a sensor in the base of the seat, then a starting fault may have occurred and the method 700 may proceed to block 712.

Figure 8:
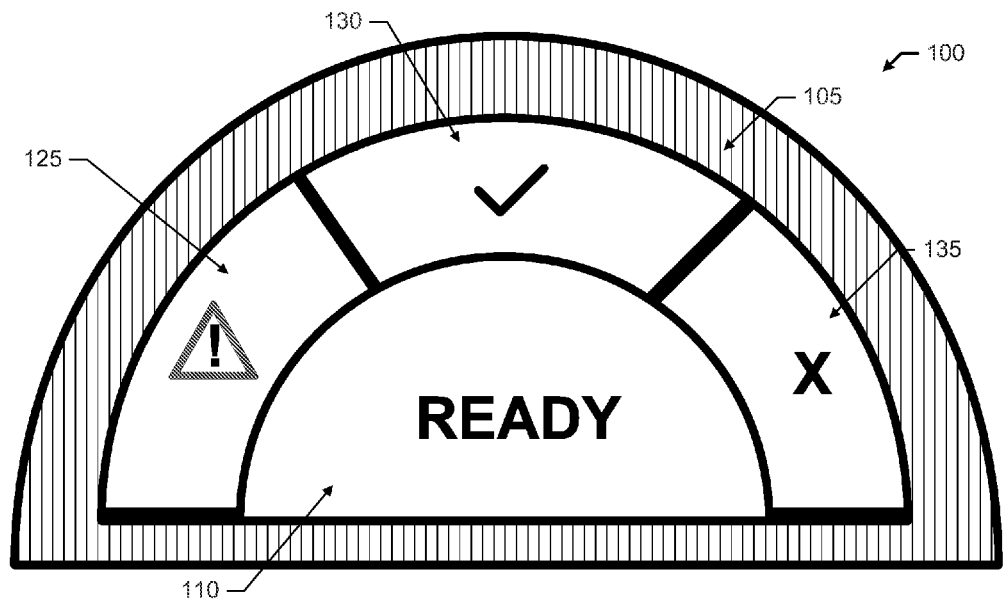
FIG. 8 is a front view of the indicator system of a riding lawn care vehicle according to an example embodiment.

If no starting faults have been determined to have occurred, the method 700 may continue to block 710, where the illuminating element illuminates as a first predetermined color (e.g., green) indicating that the riding lawn care vehicle is ready to be cranked. Such illumination may occur as a slow (e.g., 2 seconds) fade in of colored illumination from off to on. Additionally, the display screen 110 may display text such as "READY" providing further confirmation that no starting faults are outstanding. For example, FIG. 8 illustrates that the illuminating element 105 is lit up a first predetermined color relating to "ready mode" (e.g., green) and displays "READY" indicating the riding lawn care vehicle is ready to be cranked. At this point, the operator is allowed to crank the riding lawn care vehicle by further turning the key in the ignition to the cranking position. Once the engine has been cranked the display screen readout may automatically change from "READY" to whatever predetermined mode (e.g., RPM mode, temperature mode, time mode, etc.) was selected for the display screen 110 to display.

Figure 9:
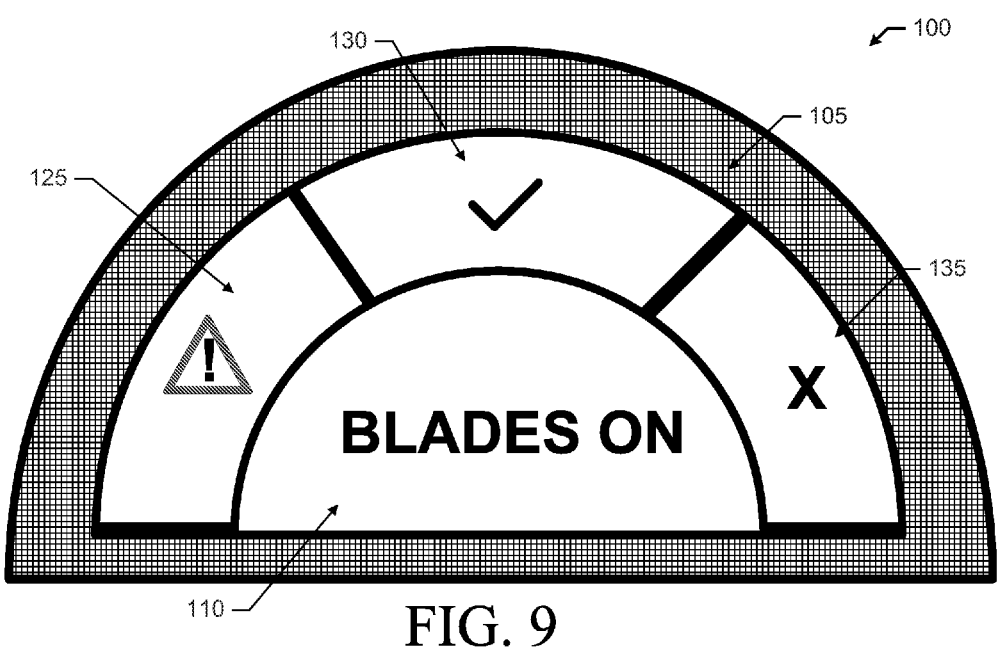
FIG. 9 is a front view of the indicator system of a riding lawn care vehicle according to another example embodiment.

On the other hand, if starting faults have been determined to have occurred in block 708, the method 700 may proceed to block 712 where the starting fault status is displayed in text on the display screen 110 and the illuminating element 105 illuminates a second predetermined color (e.g., red) providing an indication to the operator that a start fault has occurred, as was discussed above with regard to FIG. 2. As illustrated in FIG. 9, the illuminating element 105 is lit up as a predetermined color for starting faults (e.g., red) and exemplary text is presented in the display screen 110 as "BLADES ON" indicating that the detected starting fault relates to the blades being on and as such, the riding lawn mower cannot be cranked.

Referring back to FIG. 7, in block 714, a determination is made as to whether the generated start fault can be overridden. This determination may be made by the indicator system 100 accessing pre-stored information indicating which faults may be overridden and which faults may not be overridden. The manufacturer or other entity (e.g., the operator) may predetermine and preset which faults can be overridden.

If the generated start fault cannot be overridden, the method 700 may continue to block 716; otherwise, the method 700 may proceed to block 715 where a determination is made as to whether the override button 125 has been depressed (or activated). If the override button 125 has been depressed (or activated), then the method 700 may proceed to block 718; otherwise, if the override button 125 has not been depressed, then the method may continue to block 716.

In block 716, the riding lawn care vehicle is monitored to detect if any action has been performed to address or correct the issue, or if the issue has been self-corrected. Any action may be detected, such as whether the action be a corrective action performed by an operator (or other entity), whether the issue has self-corrected, or the like. For example, if the starting fault relates to the operator not being in her seat, then the action of an operator taking the seat and thus, sensing the operator being in the seat will be detected as an action that corrects the starting fault. In another example, if the engine temperature was too high for starting, the process of the engine cooling down after a predetermined time may address or correct the starting fault.

In block 718, if the issue or starting fault has not been adequately addressed or corrected from block 718, the method 700 may proceed back to block 712 where the illuminating element remains lit indicating a starting fault is still outstanding. However, if the issue or starting fault has been adequately addressed or corrected, the method 700 may return to block 706 where diagnostic tests are performed again to determine if any other starting fault(s) exists. Alternatively, if multiple faults were previously detected in block 706, then the method 700 may not need to perform diagnostic tests again and instead may handle each detected fault sequentially. If all faults have been addressed the method 700 would return to block 710 where the indicator system 100 returns to ready mode and thus, the illuminating element 105 illuminates as green or other positive color indicating the system is ready to be cranked.

Figure 10:
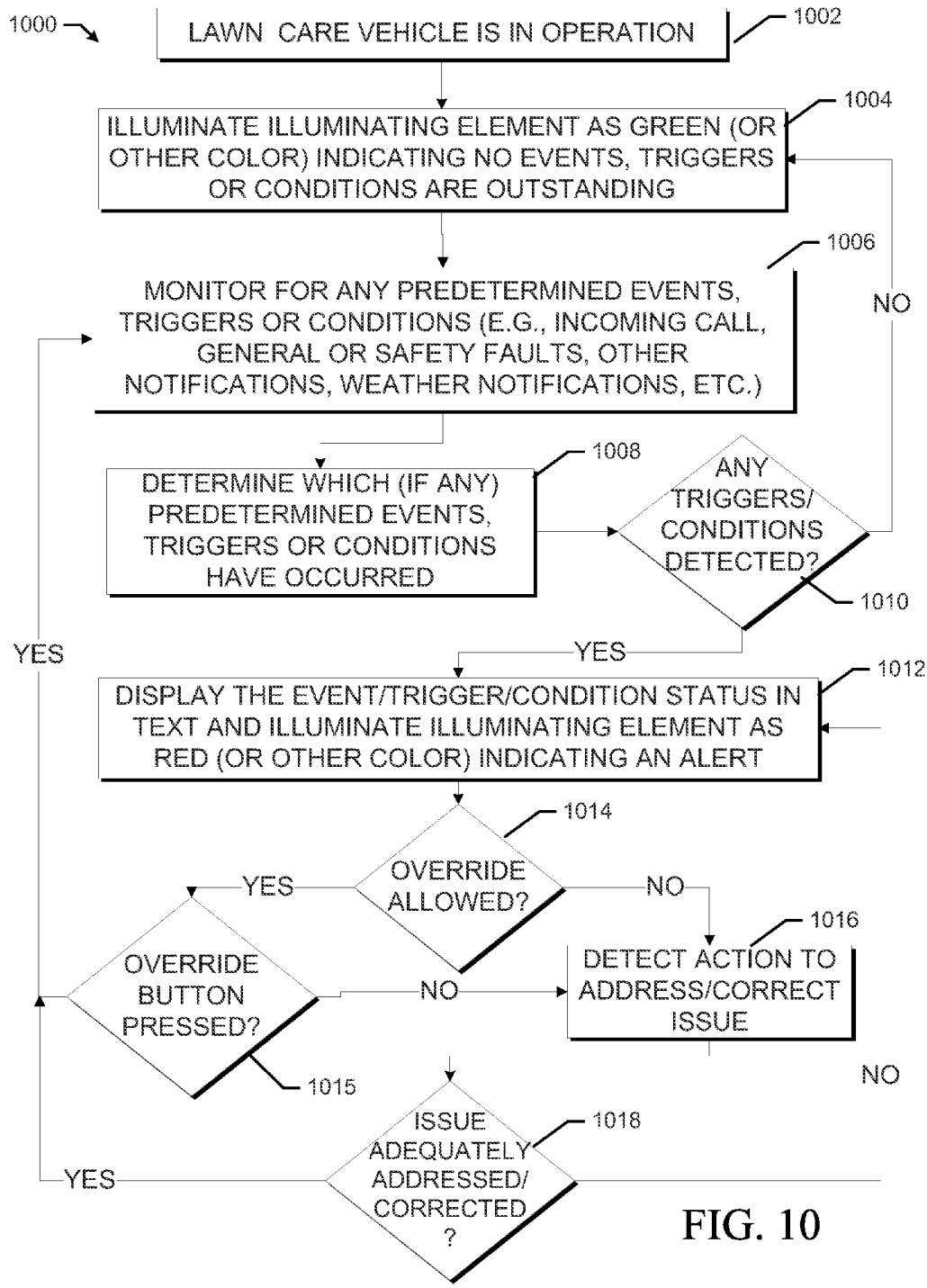
FIG. 10 illustrates a block diagram of a method of operation of the indicator system of the riding lawn care vehicle according to another example embodiment.

FIG. 10 is a block schematic diagram of a method 1000 of operation of the indicator system 100 according to various embodiments. In the illustrated embodiment of FIG. 10, the method 1000 relates to operations of the indicator system 100 while the riding lawn care vehicle is in operation. The method 1000 of FIG. 10 could occur directly in response to the method 700 of FIG. 7 in response to the riding lawn care vehicle 10 being cranked and as such, the lawn care vehicle being in operation.

In block 1002, the riding lawn care vehicle 10 is currently in operation. In one embodiment, the method 1000 may be equally operable if the riding lawn care vehicle 10 is not currently in operation but is idle or the engine is not running Regardless, in block 1004, the illuminating element 105 may illuminate as green (or other color) indicating that there are no predetermined conditions (e.g., general faults) currently outstanding (i.e., no conditions are currently occurring or have not been adequately addressed or corrected). For example, if there are no predetermined conditions currently occurring or if an override button has been depressed (or activated), then no predetermined conditions (e.g., general faults) currently outstanding.

Figure 11:
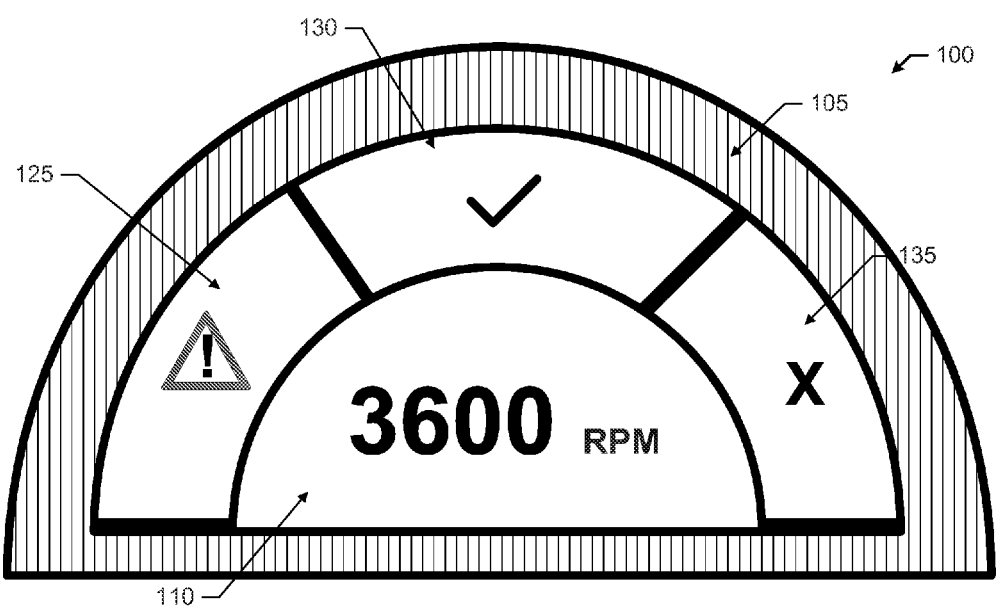
FIG. 11 is a front view of the indicator system of a riding lawn care vehicle according to another example embodiment.

FIG. 11 illustrates an example of the indicator system 100 where no predetermined conditions are currently outstanding. It is noted that in FIG. 11, the illuminating element 105 is glowing the same color as is in FIG. 8 indicating a "READY" mode. However, in FIG. 11, the display screen 110 automatically presents data (e.g., "3600 RPM") relating to current operations of the riding lawn care vehicle in FIG. 11 since the riding lawn care vehicle is in operation. Such presentation may occur automatically in response to the riding lawn care vehicle being cranked (and thus, block 1004 of FIG. 10 could proceed in response to block 710 of FIG. 7 occurring).

In block 1006, the riding lawn care vehicle 10 is monitored to determine if any predetermined conditions are outstanding. Examples of predetermined conditions are general faults (e.g., low fuel, service engine intervals, sharpen blades, low oil/oil pressure, tire pressure, engine heat warning, transmission heat warning, oil temperature too high, RPM too high or low, hood open, mechanical or electrical failure, blades loose, implement not connected properly, etc.), safety faults (e.g., steep incline, no operator, operator not qualified, obstruction ahead, child nearby, safety device not engaged, etc.), incoming call alerts (e.g., incoming phonecall, incoming short range communications, etc.), and/or any other alerts (e.g., weather alerts, internet alerts, garage door open, ambient temperature, oil temperature, RPM, time, hours in use, fuel level, PTO engaged, flat tire, etc.). The predetermined conditions could be predetermined or predefined by the operator, the riding lawn care vehicle manufacturer, and/or some other entity. As was previously discussed with regard to FIG. 2 and as will be discussed more below with respect to block 1012, whenever a predetermined condition occurs, the illuminating element 105 illuminates in one of a plurality of colors providing an alert to the operator.

In blocks 1008 and 1010, the riding lawn care vehicle 10 determines which predetermined conditions have occurred, if any. Any predetermined conditions can be determined to have occurred by circuitry of the riding lawn care vehicle 10, such as an alert monitoring system that may be installed on the riding lawn care vehicle.

In response to one or more predetermined conditions occurring, the method 1000 may continue to block 1012 where the condition status may be displayed in text on a display screen and the illumination element may be illuminated as a predetermined color (red, blue or other color) associated with the particular alert providing an indication to the operator that there is an alert. Additionally, the color of such alert may provide an indication to the user as to what the exact alert is without the operator having to investigate what the alert is.

Figure 12:
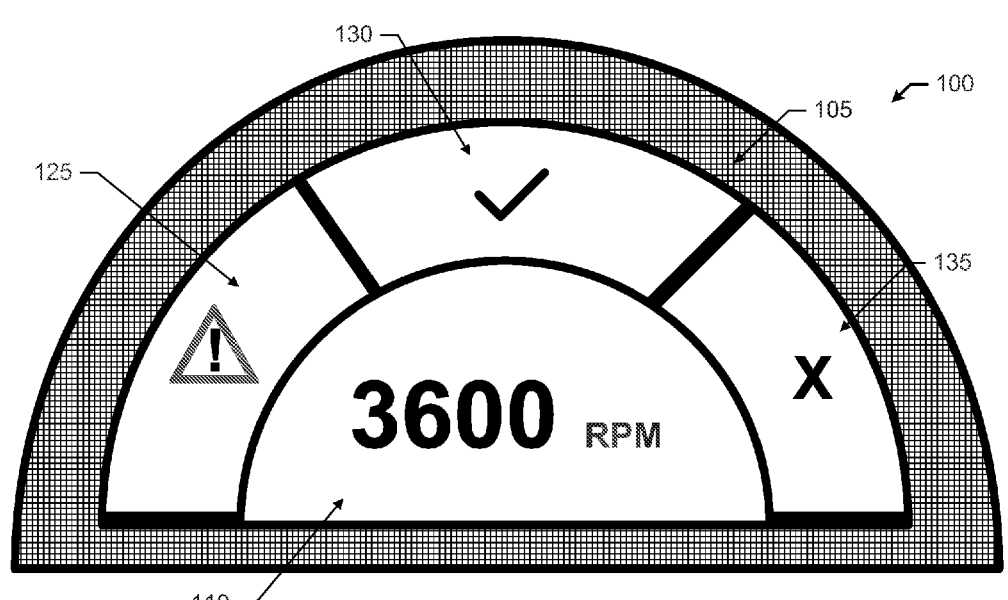
FIG. 12 is a front view of the indicator system of a riding lawn care vehicle according to another example embodiment.

Nonetheless, as previously discussed, the outstanding alert provides a visual indication that a predetermined condition has occurred and that the user may be required to act to address the alert. For example, as illustrated in FIG. 12, if the alert is a general alert, such as a steep incline, the indicator system 100 may display the illuminating element 105 as red, which is the same color presented in FIG. 9. Notably, the display screen 110 of FIG. 12 does not indicate that an alert has occurred and only the illuminating element provides an indication that an alert has occurred. In one embodiment, the indicator system 100 of FIG. 12 may have a separate display 510 similar to that of FIG. 5 or FIG. 6, which is installed at a location remote from the illuminating element 105, such as on the fender 46 of the riding lawn care vehicle, on the armrest of an operator's seat or any other location on the riding lawn care vehicle 10. In such situation where the display screen 510 is remote from the illuminating element 105, the display screen can display detailed text about the alert, as is shown in FIG. 13. For example, as illustrated in FIG. 13, the separate display screen 510 may present more detail about the alert, such as presenting text reciting "WARNING! RIDING ON TOO STEEP OF AN INCLINE." The separate display screen may also (or alternatively) provide additional details about the alert, such as providing a reference to where the operator could find more information about the alert (e.g., "SEE MANUAL AT SECTION 1.2.3 FOR MORE INFORMATION"), provide information on how to correct the alert, or provide other instructions to the operator. It should be understood that this information could also (or alternatively) be display on the display screen 110 proximate to the illuminating element 105.

It should also be understood that the separate display 510 need not be mounted on the riding lawn care vehicle, but could alternatively be the display screen of the operator's telecommunications device (e.g., the operator's smartphone, the operator's tablet, etc.). In such situation, the display screen 510 would communicate alerts and other information wirelessly through an interface of the indicator system 100.

As another example illustrated in FIG. 14, the operator could receive an electronic communications (e.g., a cellular telephone call, short range communications call, page notification, email, SMS or MMS message, calendar reminder, etc.) and the indicator system 100 detect such electronic call or message via a short range communication system (e.g., Bluetooth®). In response to detecting such incoming electronic communications, the indicator system 100 would instruct the illuminating element 105 to light up a predetermined color associated with an electronic communications, such as blue. This predetermined color for an incoming call alert may be different than the color associated with a fault in operating the riding lawn care vehicle (e.g., green) and different from the color indicating the lawn care vehicle has no outstanding faults and/or other conditions (e.g., red). This concept is illustrated in FIG. 14, which is shown displaying a color different than FIGS. 8-9 and 11-12. If the operator answers the electronic communications, the riding lawn car vehicle may be configured to be turned off as the riding lawn care vehicle may be too noisy for a phonecall or for safety concerns so that the operator is not reading email while operating power equipment.

Also, as illustrated in FIG. 14, the display screen 110 may present information about the alert, such as "INCOMING CALL" in the even that the alert is an incoming call. This may especially be useful if a single color relates to a plurality of alerts. In this regard, the illuminating element 105 can be a method of describing the alert in a general category sense and the display screen 110 further narrow what the actual alert relates to.

In some embodiments, the incoming call could be a telephone call or a short range call. In the event that the call is a short range call, the operator may receive a call from a handheld device within a proximate range such as 100-200 yards. For example, if a caller has a short range wireless communications device and the operator of the riding lawn care vehicle has a receiver of the short range wireless communications system, the caller can call and the operator of the riding lawn care vehicle would be notified of a call via the indicator system 100 since the indicator system 100 would be paired with the operator's receiver.

Additionally, if the operator is receiving an electronic communications, the display screen 110 and/or the separate display 510 may provide more detail about the incoming communications. For example, as illustrated in FIG. 15, a separate display screen 510 may present an alert indicating that a telephone call is incoming and present more detail about the incoming call, such as the phone number.

Figure 16:
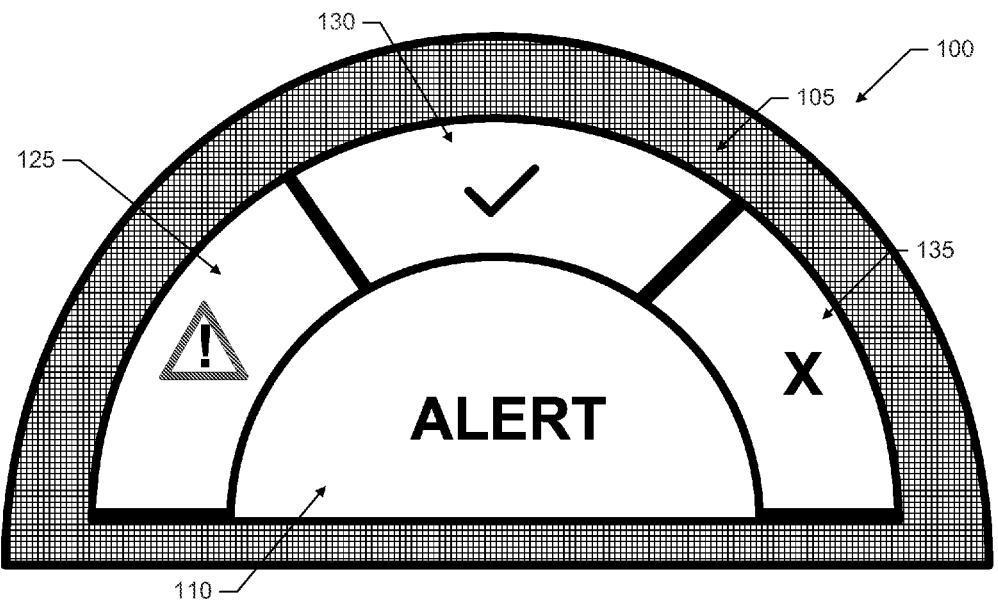
FIG. 16 is a front view of the indicator system of a riding lawn care vehicle according to another example embodiment.
Figure 17:
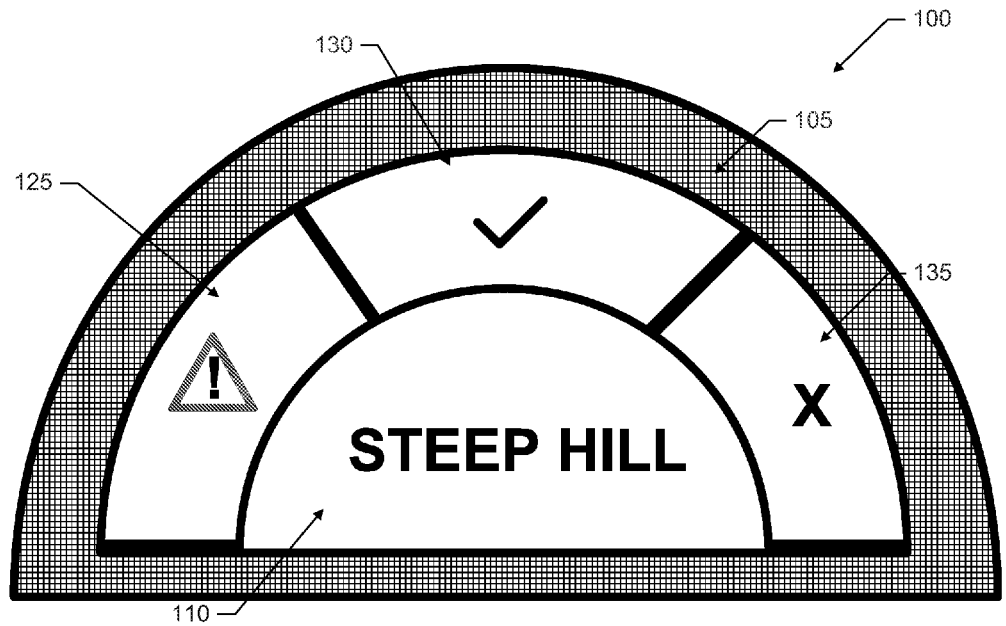
FIG. 17 is a front view of the indicator system of a riding lawn care vehicle according to another example embodiment.

Other embodiments of the indicator system 100 are illustrated in FIGS. 16-17. It should be understood that the display screen 110 can be configured to provide an additional notification of an alert in the event that a person is color blind. For example, as shown in FIG. 16, the display screen may display "ALERT," in addition to the illuminating element 105 glowing a predetermined color. In FIG. 17, the display screen 110 may go further and display what the actual alert relates to, such as displaying "STEEP HILL" if the alert relates to a steep incline.

Referring back to FIG. 10, in block 1014, a determination is made as to whether an override is allowed for the predetermined condition occurring. Examples of conditions where an override may be allowed are general faults, such as low fuel or sharpen blades where the user may still safely operate the riding lawn care vehicle 10. If override is allowed, the method 100 may proceed to block 1015 where it is determined if the override button 125 has been selected. If so, the method continues to block 1008 to determine if any conditions are outstanding. If override is not allowed, the method may continue to block 1016.

In block 1016, the method 1000 may detect any actions to address or correct the issue underlying the condition. For example, if the condition is low fuel, the user may add fuel to correct the low fuel issue. If the condition is an incoming phonecall, the user may answer the phonecall thereby addressing the incoming call.

A determination is made according to block 1018 as to whether the issue has been adequately addressed or corrected. If so, the method may continue to block 1008 where it is determined whether any other conditions are outstanding.

In some embodiments, the indicator system 100 may be placed into "sleep mode" if there is no operator present and/or if the riding lawn care vehicle has been idle or non-operating for a predetermined time. This will ensure that the indicator system 100 will not unnecessarily drain the battery while the indicator system 100 while the riding lawn care vehicle is not in operation or if the operator is not available to receive the alerts or notifications.

It should be understood that various other alerts and notifications may be realized with the indicator system 100. In one embodiment, the indicator system 100 could have one or more transceivers to communicate wirelessly. For example, a radio or satellite transceiver could be included with the indicator system 100 or part of the riding lawn care vehicle 10 to communicate with a cellular tower and/or a satellite which is connected with internet servers. Such communications could provide the indicator system 100 with various alerts, such as Emergency Broadcasting System alerts, weather notifications (e.g., whether a thunderstorm is imminent), breaking news feeds, or any other information that can be transmitted through the Internet.

As another embodiment, the indicator system 100 can include a transceiver that would operate the operator's garage door the same as the garage door's remote control. The indicator system 100 may indicate to the operator whether the garage door is open or closed and the garage door remote transceiver would transmit a radio signal to open the garage door in response to the operator sending a signal from the garage door transceiver to the garage door system to open the garage door.

Elements of embodiments of the present invention, such as method 800 of FIG. 8, is embodied in hardware and/or software as a computer program code that may include firmware, resident software, microcode or the like. Additionally, elements of the invention take the form of a computer program product on a computer-usable or computer-readable storage medium having computer-usable or computer-readable program code embodied in a medium for use by or in connection with a system. Examples of such a medium are illustrated in FIG. 8 as medium 714 or as a memory (not shown) of the indicator system 100. A computer-usable or readable medium is any medium that contains, stores, communicates or transports the program for use by or in connection with a system. The medium, for example, is an electronic, magnetic, optical, electromagnetic, infrared or semiconductor system or the like.

As will be appreciated by one of skill in the art, the methods of the present invention, such as methods 700 and 1000, may be embodied as a method (including, for example, a computer-implemented process, and/or any other process), apparatus (including, for example, a system, machine, device, computer program product, and/or the like), or a combination of the foregoing. Accordingly, embodiments of the methods of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized in methods 700 and 1000. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle, comprising:
    an engine;
    a start fault indicator system configured to run a check for faults that should be corrected prior to starting the engine, the start fault indicator system comprising:
        an illuminating element;
        circuitry to perform start fault checks to determine if a start fault has occurred;
        wherein the illuminating element is configured to present a first predetermined color in response to detection of a start fault occurring, and
        wherein the illuminating element is configured to present a second predetermined color in response to determining that no start faults are outstanding, the first and second predetermined colors being different colors; and
    an operator presence sensor for sensing a presence of an operator on the riding lawn care vehicle, wherein the start fault indicator system is configured to initiate the start fault checks in response to the operator presence sensor sensing the presence of the operator on the riding lawn care vehicle when the engine is not started.

2. The riding lawn care vehicle of claim 1, further comprising:
    an ignition configured to receive a key, wherein the start fault indicator system is configured to initiate the start fault checks in response to the key being inserted into the ignition.

3. The riding lawn care vehicle of claim 1, further comprising:
    an ignition configured to receive a key, wherein the start fault indicator system is configured to initiate the start fault checks in response to the key being inserted into the ignition and turned.

4. The riding lawn care vehicle of claim 1, further comprising:
    an ignition configured to start the engine of the riding lawn care vehicle in response to operator input, wherein the start fault indicator system is configured to prevent the ignition from starting the engine until all detected start faults are cleared or overridden.

5. The riding lawn care vehicle of claim 1, wherein the determining if the start fault has occurred comprises at least one of:
    detecting brakes of the riding lawn care vehicle not being engaged;
    detecting that there is no operator in a seat of the riding lawn care vehicle; or
    detecting if blades of a cutting deck of the riding lawn care vehicle are on.

6. The riding lawn care vehicle of claim 1, further comprising a display screen configured to:
    display textual detail about a detected start fault based at least partially on the illuminating element being illuminated; and
    display data relating to a default predetermined mode in response to detection of no outstanding start faults.

7. The riding lawn care vehicle of claim 1, wherein the start fault indicator system further comprises a mode select button configured to select what data the display screen outputs.

8. The riding lawn care vehicle of claim 1, wherein the start fault indicator system further comprises an override button that, when activated, is configured to override an outstanding start fault in response to the outstanding start fault occurring.

9. The riding lawn care vehicle of claim 1, wherein the illuminating element at least partially surrounds a perimeter of a display screen, and the display screen is configured to display text or graphics relating to a start fault.

10. A method of alerting an operator of a riding lawn care vehicle, comprising:
    performing start fault checks to determine if a start fault has occurred, the start fault being of a nature that should be corrected prior to starting an engine of the riding lawn care vehicle, wherein the start fault checks are performed in response to an operator presence sensor sensing a presence of the operator on the riding lawn care vehicle when the engine is not started,
    sending a signal, using a computing device, to an illuminating element to present a first predetermined color in response to detection of a start fault occurring, the detection being caused by detecting one or more predetermined triggers, and
    sending a signal to the illuminating element to present a second predetermined color in response to determining that no start faults are outstanding, the first and second predetermined colors being different colors.

11. The method of claim 10, further comprising in response to a predetermined triggering condition having occurred, displaying details about the predetermined triggering condition while the illuminating element is illuminated.

12. The method of claim 10, further comprising:
    in response to a predetermined triggering condition having been detected indicating an alert is outstanding:
    determining that the alert has been corrected or addressed; and
    changing illumination of the illuminating element from the second predetermined color to the first predetermined color.

13. The method of claim 10, further comprising:
    in response to a predetermined triggering condition having been detected indicating an alert is outstanding:
    receiving activation from an override button indicating that a user desires to override the predetermined triggering condition;
    determining whether override of the predetermined triggering condition is allowed; and
    in response to determining that override is allowed for the predetermined triggering condition and in response to receiving activation from the override button, overriding the alert so that the alert is no longer outstanding.

14. The method of claim 10, wherein the determining if any predetermined triggering conditions have occurred comprises determining if the operator is seated in a seat of the riding lawn care vehicle, wherein in response to determining the operator is seated in the seat, illuminating the illuminating element to the first predetermined color; and wherein in response to determining the operator is not seated in the seat, illuminating the illuminating element to the second predetermined color and displaying text on a display screen indicating a no operator fault.

15. The method of claim 10, wherein the determining if any predetermined triggering conditions have occurred comprises detecting if brakes of the riding lawn care vehicle are not engaged, and wherein in response to detecting that brakes of the riding lawn care vehicle are engaged, illuminating the illuminating element to the first predetermined color; and wherein in response to detecting that brakes of the riding lawn care vehicle are not engaged, illuminating the illuminating element to the second predetermined color and displaying text on a display screen indicating a braking engaged fault.

16. The method of claim 10, wherein the determining if any predetermined triggering conditions have occurred comprises detecting if blades of a cutting deck of the riding lawn care vehicle are on, and wherein in response to detecting that blades of the cutting deck of the riding lawn care vehicle are not on, illuminating the illuminating element to the first predetermined color; and wherein in response to detecting that if blades of the cutting deck of the riding lawn care vehicle are on, illuminating the illuminating element to the second predetermined color and displaying text on a display screen indicating a blades on fault.

17. A start fault indicator system for outdoor power equipment comprising:

an illuminating element;

circuitry to perform start condition checks to determine if a start fault has occurred;

wherein the illuminating element is configured to:
   illuminate a first predetermined color in response to detection of a start fault occurring, and
   illuminate a second predetermined color in response to determining that no start fault is outstanding, the first and second predetermined colors being different colors, wherein the start condition checks are performed in response to an operator presence sensor sensing a presence of the operator on the riding lawn care vehicle when the engine is not started.

18. The start fault indicator system of claim 17, further comprising a display screen proximate to the illuminating element.

19. The start fault indicator system of claim 18, wherein in response to detection of a start fault occurring, the display screen is configured to display more detail about the start fault while the illuminating element is illuminated, and wherein in response to detection of no start faults, the display screen is configured to default to a predetermined mode.

* * * * *